US010284774B2

United States Patent
Fukuya et al.

(10) Patent No.: US 10,284,774 B2
(45) Date of Patent: May 7, 2019

(54) INFORMATION TERMINAL APPARATUS, IMAGE PICKUP APPARATUS, IMAGE-INFORMATION PROCESSING SYSTEM, AND IMAGE-INFORMATION PROCESSING METHOD FOR CONTROLLING TIME-LAPSE IMAGING

(71) Applicant: Olympus Corporation, Hachioji-shi, Tokyo (JP)

(72) Inventors: Yoshiyuki Fukuya, Sagamihara (JP); Kazuhiko Shimura, Hachioji (JP); Nobuyuki Shima, Machida (JP); Kazuo Kanda, Higashiyamato (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 22 days.

(21) Appl. No.: 15/384,922

(22) Filed: Dec. 20, 2016

(65) Prior Publication Data
US 2017/0187954 A1    Jun. 29, 2017

(30) Foreign Application Priority Data

Dec. 25, 2015 (JP) .................. 2015-254256
Mar. 1, 2016 (JP) .................. 2016-039194

(51) Int. Cl.
*H04N 5/232* (2006.01)
*H04N 5/235* (2006.01)

(52) U.S. Cl.
CPC ....... *H04N 5/23232* (2013.01); *H04N 5/2356* (2013.01); *H04N 5/23216* (2013.01); *H04N 5/23293* (2013.01)

(58) Field of Classification Search
CPC .......... H04N 5/23232; H04N 5/23216; H04N 5/23293; H04N 5/2356
See application file for complete search history.

(56) References Cited

U.S. PATENT DOCUMENTS 4,658,319 A * 4/1987 Tripp .................. H04N 17/06
                                                386/226
9,158,974 B1 * 10/2015 Laska .................. G06T 7/246
(Continued)

FOREIGN PATENT DOCUMENTS

JP    2015-053670    3/2015

*Primary Examiner* — Nicholas G Giles
(74) *Attorney, Agent, or Firm* — John C. Pokotylo; Pokotylo Patent Services

(57) ABSTRACT

An information terminal apparatus includes a communication section configured to perform communication with an image pickup apparatus capable of performing time-lapse photographing, a signal processing section configured to generate, halfway in a photographing period by the image pickup apparatus, a check image based on a plurality of picked-up images transmitted from the image pickup apparatus and acquired via the communication section, and a display control section configured to display the check image generated by the signal processing section. Halfway in photographing of the time-lapse photographing, a time-lapse moving image is generated using a photographing result of the time-lapse photographing performed to that point and displayed, whereby quality of the time-lapse moving image is made predictable. A change of setting of the time-lapse photographing is received and reflected on subsequent time-lapse photographing, whereby a user easily obtains a desired picked-up image.

18 Claims, 22 Drawing Sheets

(56) References Cited

U.S. PATENT DOCUMENTS

| | | | | |
|---|---|---|---|---|
| 9,819,876 | B2* | 11/2017 | Yamamoto | H04N 5/2621 |
| 2002/0051010 | A1* | 5/2002 | Jun | G06F 17/30787 |
| | | | | 715/723 |
| 2008/0232766 | A1* | 9/2008 | Van Quickelberge | |
| | | | | H04N 5/783 |
| | | | | 386/224 |
| 2013/0235226 | A1* | 9/2013 | Karn | H04N 5/23241 |
| | | | | 348/220.1 |
| 2014/0105564 | A1* | 4/2014 | Johar | H04N 5/915 |
| | | | | 386/226 |
| 2014/0300769 | A1* | 10/2014 | Hartford | H04N 1/215 |
| | | | | 348/222.1 |
| 2014/0347519 | A1* | 11/2014 | Yamamoto | H04N 5/235 |
| | | | | 348/231.99 |
| 2015/0036998 | A1* | 2/2015 | Ishimaru | H04N 9/8205 |
| | | | | 386/228 |
| 2015/0043893 | A1* | 2/2015 | Nishizaka | G11B 27/005 |
| | | | | 386/278 |

* cited by examiner

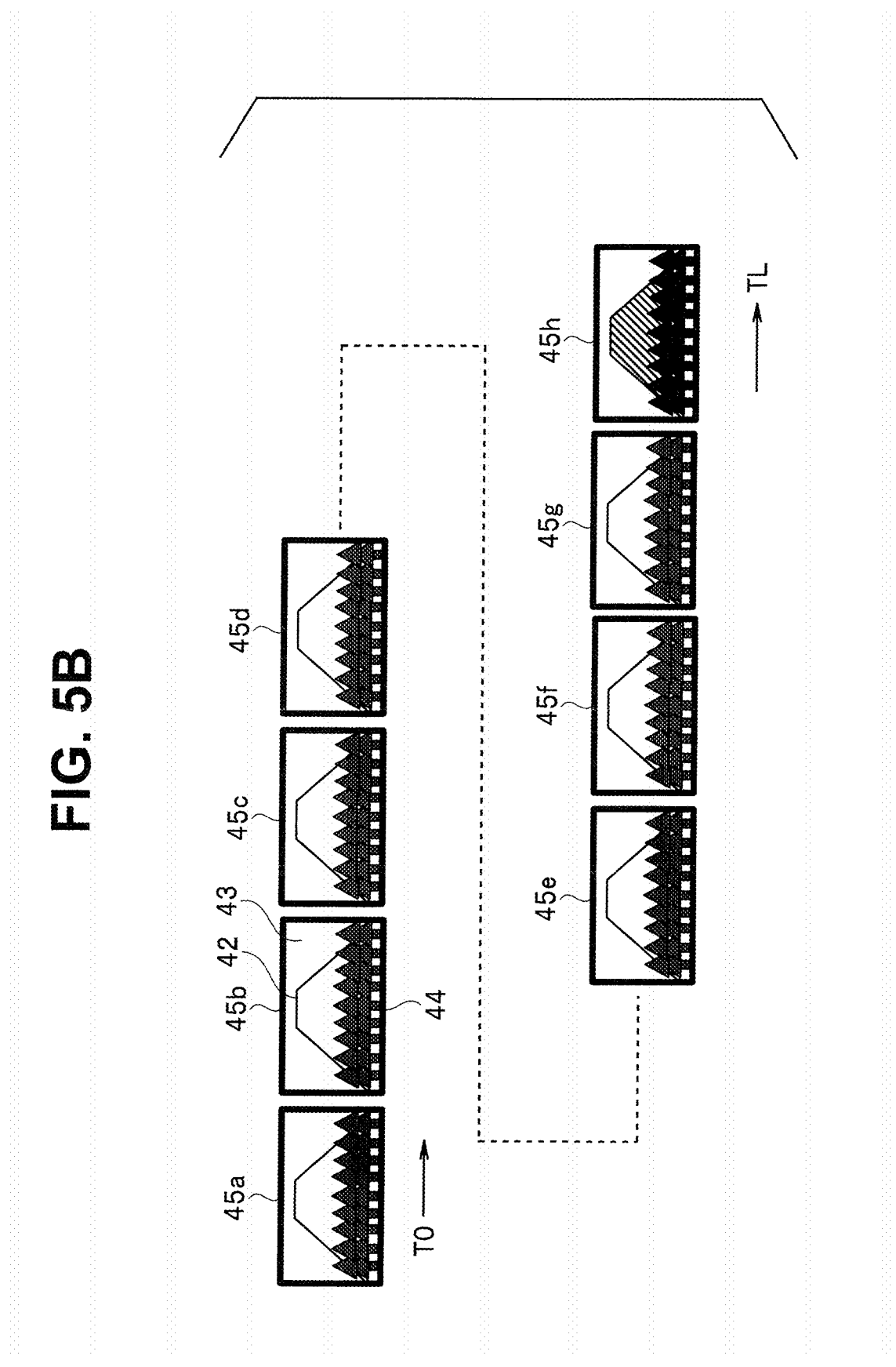

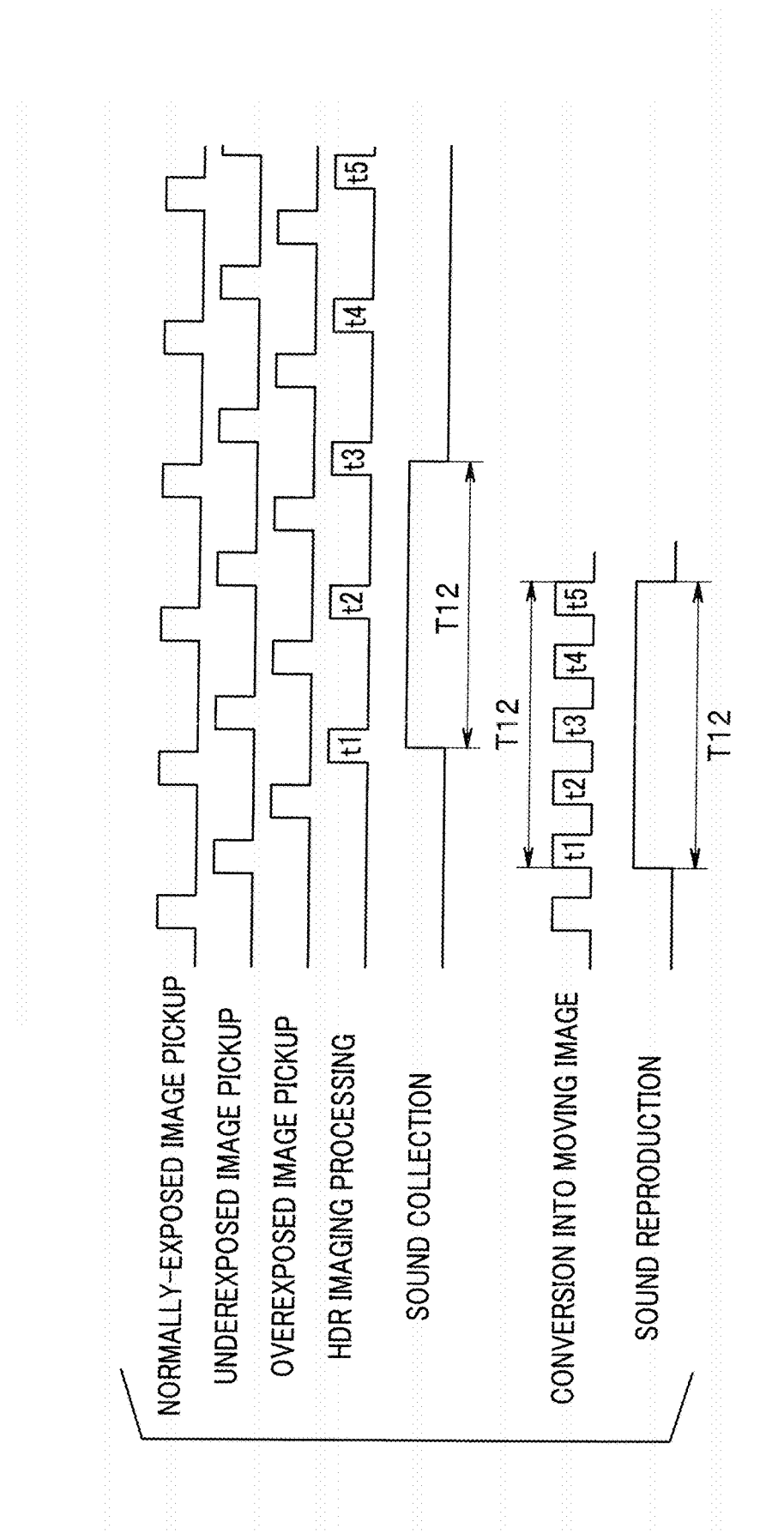

INFORMATION TERMINAL APPARATUS, IMAGE PICKUP APPARATUS, IMAGE-INFORMATION PROCESSING SYSTEM, AND IMAGE-INFORMATION PROCESSING METHOD FOR CONTROLLING TIME-LAPSE IMAGING

CROSS REFERENCE TO RELATED APPLICATIONS

This application claim is benefit of Japanese Application Nos. 2016-39194 in Japan on Mar. 1, 2016, and 2015-254256 in Japan on Dec. 25, 2015, the contents of which are incorporated by this reference.

BACKGROUND OF THE INVENTION

1. Field of the Invention

The present invention relates to an information terminal apparatus, an image pickup apparatus, an image-information processing system, and an image-information processing method capable of controlling time-lapse photographing.

2. Description of the Related Art

In recent years, portable apparatuses with photographing functions (photographing apparatuses) such as a digital camera have been spreading. Most of the photographing apparatuses of this type enable users to enjoy various kinds of image processing. For example, an apparatus capable of performing time-lapse photographing for continuously photographing images at a predetermined time interval and generating a moving image having a reproduction time shorter than a photographing time has also been commercialized. Various methods of using the time-lapse photographing are conceivable. For example, the time-lapse photographing is used to photograph scenes in one day with a camera fixed to a tripod and observe a change of the scenes in a short time. Further for example, a person wearing a wearable camera photographs a town while walking and observes situations of the town in a short time.

Such photographing apparatuses determine a time interval and the number of times of photographing of the time-lapse photographing and perform the photographing (the time-lapse photographing). An apparatus, which generates a time-lapse moving image, arranges a plurality of time-lapse photographed images on a time line and generates a moving image having a predetermined frame rate (a time-lapse moving image).

There is also a photographing apparatus including the time-lapse photographing function and the time-lapse moving image generating function described above. For example, Japanese Patent Application Laid-Open Publication No. 2015-53670 discloses an apparatus that can set, independently from each other, parameters of the time-lapse photographing and reproduction parameters related to reproduction of a time-lapse moving image photographed with the photographing parameters.

SUMMARY OF THE INVENTION

An information terminal apparatus according to an aspect of the present invention includes: a communication section configured to perform communication with an image pickup apparatus capable of performing time-lapse photographing; a signal processing section configured to generate, halfway in a photographing period by the image pickup apparatus, a check image based on a plurality of picked-up images transmitted from the image pickup apparatus and acquired via the communication section; and a display control section configured to display the check image generated by the signal processing section.

An image pickup apparatus according to an aspect of the present invention includes: an image pickup section capable of performing time-lapse photographing; a signal processing section configured to generate, halfway in a photographing period by image pickup of the time-lapse photographing, a check image based on a plurality of picked-up images obtained by the image pickup section; and a display control section configured to display the check image.

An image-information processing system according to an aspect of the present invention includes: an image pickup apparatus including: an image pickup section capable of performing time-lapse photographing; a first signal processing section configured to generate a moving image formed by a plurality of picked-up images obtained by the image pickup section; and a first communication section configured to transmit the picked-up images to an information terminal apparatus; and an information terminal apparatus including: a second communication section configured to perform communication with the first communication section and receive the picked-up images; a second signal processing section configured to generate, halfway in a photographing period by the image pickup section, a check image based on the plurality of picked-up images received via the second communication section; and a display control section configured to display the check image generated by the second signal processing section.

An image-information processing method according to an aspect of the present invention includes: receiving at least one picked-up image obtained by an image pickup apparatus capable of performing time-lapse photographing; generating, as a check moving image, a plurality of the picked-up images received in a photographing period by the image pickup apparatus; and displaying the check moving image.

The above and other objects, features and advantages of the invention will become more clearly understood from the following description referring to the accompanying drawings.

BRIEF DESCRIPTION OF THE DRAWINGS

FIG. 5B is an explanatory diagram for explaining a time-lapse moving image;

FIG. 17 is an explanatory diagram showing a fourth embodiment of the present invention.

DETAILED DESCRIPTION OF THE PREFERRED EMBODIMENTS

Embodiments of the present invention are explained in detail below with reference to the drawings.

First Embodiment

Figure 1:
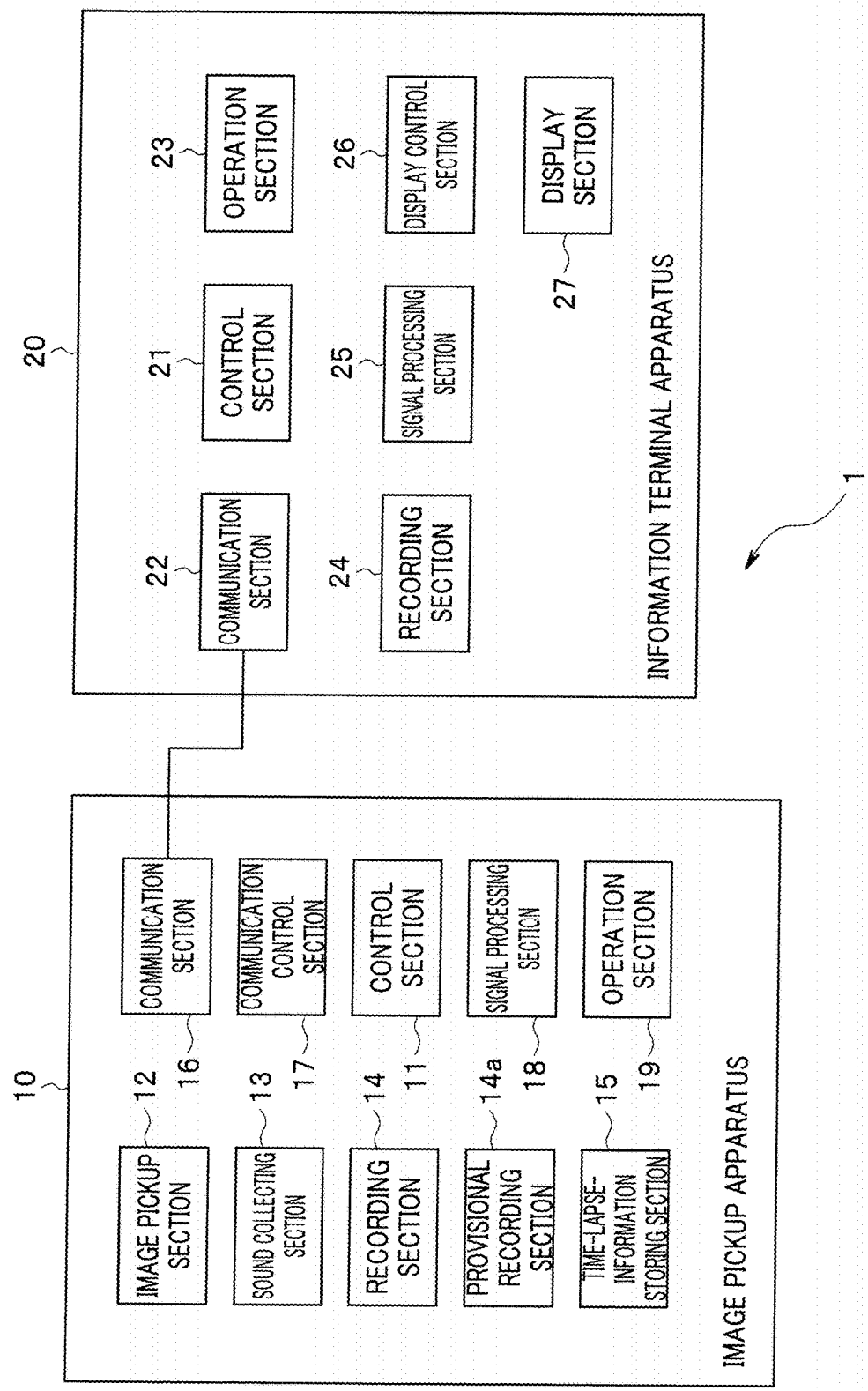
FIG. 1 is a block configuration diagram showing a circuit configuration of an image-information processing system configured by an image pickup apparatus and an information terminal apparatus according to a first embodiment of the present invention.

FIG. 1 is a block diagram showing a circuit configuration of an image-information processing system configured by an image pickup apparatus and an information terminal apparatus according to a first embodiment of the present invention.

In the image-information processing system in the present embodiment, the information terminal apparatus acquires an image by time-lapse photographing of an image pickup section, supports a user to be capable of checking an effect of a time-lapse moving image halfway in the time-lapse photographing, and enables an instruction of a setting change of photographing parameters of the time-lapse photographing. The image pickup section receives setting of parameters from the information terminal apparatus to enable the user to perform photographing for acquiring a desired time-lapse moving image at an end time of the time-lapse photographing.

In FIG. 1, an image-information processing system 1 in the present embodiment is configured by an image pickup apparatus 10 and an information terminal apparatus 20. The image pickup apparatus 10 can be configured by a photographing apparatus such as a digital camera. The image pickup apparatus 10 includes an image pickup section 12 configured by an image pickup device such as a CCD or a CMOS sensor. A not-shown lens is provided in the image pickup section 12. An object optical image is guided via the lens. The lens may be a lens including zooming and focusing functions. The image pickup section 12 converts, with the image pickup device, the object optical image into an electric signal and obtains an image pickup signal.

A control section 11 is provided in the image pickup apparatus 10. The control section 11 controls respective sections of the image pickup apparatus 10. The control section 11 may be configured by a not-shown processor such as a CPU and may operate according to a computer program stored in a not-shown memory. The image pickup apparatus 10 includes an operation section 19 including a shutter button, function buttons, and various switches for photographing mode setting and the like, which are not shown in the figure, provided in a housing of the image pickup apparatus 10. The operation section 19 receives user operation and outputs an operation signal based on the user operation to the control section 11. The control section 11 can generate a focus signal and a zoom signal on the basis of the operation signal outputted from the operation section 19 and drive the lens of the image pickup section 12 to perform zooming, focusing, and the like. The control section 11 can output a driving signal for the image pickup device to the image pickup section 12 to control shutter speed, an exposure time, and the like.

The control section 11 can control the image pickup section 12, perform photographing at a predetermined time interval, and also perform time-lapse photographing for performing reproduction in a shorter time than a photographing time. Note that the photographing parameters of the time-lapse photographing, for example, information concerning a photographing interval and a photographing time are stored in a time-lapse-information storing section 15. The control section 11 reads out the information stored in the time-lapse-information storing section 15 and controls the time-lapse photographing.

The control section 11 can read out a picked-up image outputted from the image pickup section 12 and supply the picked-up image to a signal processing section 18. The signal processing section 18 performs predetermined signal processing, for example, color adjustment processing, matrix conversion processing, noise removal processing, and other various kinds of signal processing on the read-out picked-up image.

A recording section 14 and a provisional recording section 14a are provided in the image pickup apparatus 10. The control section 11 can give the picked-up image subjected to the signal processing by the signal processing section 18 to the recording section 14 or the provisional recording section 14a and record the picked-up image in the recording section 14 or the provisional recording section 14a. For example, the control section 11 can give a picked-up image acquired in a normal photographing mode to the recording section 14 and record the picked-up image in the recording section 14. The control section 11 can give a picked-up image from the image pickup section 12 acquired in a time-lapse photographing mode to the provisional recording section 14a and provisionally record the picked-up image in the provisional recording section 14a.

The signal processing section 18 is controlled by the control section 11 to arrange the picked-up image recorded in the provisional recording section 14a on a time line to be capable of generating a time-lapse moving image. Note that information concerning a frame rate necessary for the generation of the time-lapse moving image is stored in the time-lapse-information storing section 15. The control section 11 reads out the information stored in the time-lapse-information storing section 15 and controls the generation of the time-lapse moving image.

In recording image files of the picked-up image, the time-lapse moving image, and the like, the signal processing section 18 can also perform compression processing. Images after the compression processing can be recorded in the recording section 14 and the provisional recording section 14a.

A communication section 16 is provided in the image pickup apparatus 10. A communication section 22 is provided in the information terminal apparatus 20. The communication section 16 is controlled by a communication control section 17 to perform transmission and reception of information to and from the communication section 22 of the information terminal apparatus 20 via a predetermined transmission line. Commands and parameters are transferred to the control section 11 from the information terminal apparatus 20 via the communication section 16. The control section 11 can control the respective sections according to the transferred commands and parameters.

The communication control section 17 is controlled by the control section 11. The communication control section 17 can transmit an image picked up by the image pickup apparatus 10 to the communication section 22 of the information terminal apparatus 20 via the communication section 16.

The image pickup apparatus 10 includes a sound collecting section 13. The sound collecting section 13 is configured by a not-shown microphone or the like. The sound collecting section 13 can convert ambient sound into a sound signal and output the sound signal to the signal processing section 18. The signal processing section 18 can apply predetermined signal processing to the sound signal outputted from the sound collecting section 13 and thereafter give the sound signal to the recording section 14 and the provisional recording section 14a. The control section 11 can record collected sound in association with a picked-up image acquired at timing corresponding to the sound collection.

The information terminal apparatus 20 can be configured by a smartphone, a tablet PC, or the like. The information terminal apparatus 20 includes a control section 21. The control section 21 controls respective sections of the information terminal apparatus 20. The control section 21 may be configured by a not-shown processor such as a CPU and may operate according to a computer program stored in a not-shown memory. The information terminal apparatus 20 includes an operation section 23 including not-shown switches and the like provided on a housing of the information terminal apparatus 20. Note that the operation section 23 can be configured by a software keyboard or the like obtained by a computer program executed by the control section 21 or can be configured by a not-shown touch panel or the like provided in a display section 27 explained below.

The operation section 23 receives user operation and outputs an operation signal based on the user operation to the control section 21. The control section 21 controls the respective sections on the basis of the operation signal outputted from the operation section 23.

A recording section 24 is provided in the information terminal apparatus 20. The recording section 24 can record information given from the control section 21. For example, an image and various parameters transmitted from the image pickup apparatus 10, for example, information concerning time-lapse photographing and information concerning time-lapse moving image generation (hereinafter referred to as information concerning time lapse) are given to and recorded in the recording section 24. In the recording section 24, information concerning time lapse based on user operation of the operation section 23 and information concerning time lapse initially set by the control section 21 are also recorded.

In the present embodiment, a signal processing section 25 is provided in the information terminal apparatus 20. The signal processing section 25 is controlled by the control section 21 to execute various kinds of signal processing. For example, the signal processing section 25 can read out a plurality of images obtained by the time-lapse photographing and the information concerning the time lapse from the recording section 24 and generate a time-lapse moving image. The signal processing section 25 gives the generated time-lapse moving image to a display control section 26 as a time-lapse check moving image, which is a check image.

The display control section 26 executes various kinds of processing concerning display. The display control section 26 is controlled by the control section 21 to control display of the display section 27. The display section 27 includes a display screen such as an LCD and displays an image given from the display control section 26. For example, the control section 21 can control the display control section 26 to display check indication including a time-lapse check moving image on the display screen of the display section 27. In order to change the time-lapse check moving image to a desired movie, the control section 21 can display adjustment indication for adjusting various parameters used for the time-lapse photographing and the time-lapse moving image generation of the image pickup apparatus 10 and designating an image (an image to be deleted) not used for the time-lapse moving image generation.

A touch panel functioning as the operation section 23 may be provided on the display screen of the display section 27. The touch panel can generate an operation signal corresponding to a position on the display screen pointed by the user with a finger. The operation signal is supplied to the control section 21. Consequently, when the user touches the display screen or slides the finger on the display screen, the control section 21 can detect the operation. That is, the control section 21 can detect various kinds of operation such as operation of a touch position of the user, operation for closing and separating fingers (pinch operation), slide operation, and operation of a position to which the finger reaches according to the slide operation, a sliding direction, and a period in which the finger touches the display screen. The control section 21 can execute processing corresponding to the user operation.

The control section 21 sets, in the signal processing section 25, information concerning setting values of the parameters by the user operation on the adjustment indication and the image to be deleted. The signal processing section 25 can generate, according to the parameters based on the user operation, a time-lapse moving image using images not deleted by the user operation. When enough time until the next photographing in the time-lapse photographing exists, check indication including a time-lapse check moving image based on the time-lapse moving image may be displayed on the display screen of the display section 27. In this case, the user can change the time-lapse check moving image to a desired movie while viewing the check indication. That is, the user can visually match the time-lapse check moving image with preference of the user.

The control section 21 can transmit the information concerning the parameters necessary for the user to obtain a desired time-lapse check moving image and the image to be deleted (the information concerning the time lapse) to the image pickup apparatus 10 via the communication section 22. When the information concerning the time lapse is given to the control section 11 of the image pickup apparatus 10 via the communication section 16, the control section 11 records the information in the time-lapse-information storing section 15 and thereafter causes the image pickup apparatus 10 to carry out the time-lapse photographing conforming to the parameters. The control section 11 performs control on the signal processing section 18 to generate a time-lapse moving image using updated information concerning the time-lapse moving image generation.

The control section 11 receives a change of the information concerning the time lapse from the information terminal apparatus 20 until the time-lapse photographing ends. At a stage when the time-lapse photographing ends, the control section 11 causes the signal processing section 18 to generate a time-lapse moving image on the basis of a series of images recorded in the provisional recording section 14*a* and records the time-lapse moving image in the recording section 14 as a moving image file.

Figure 2:
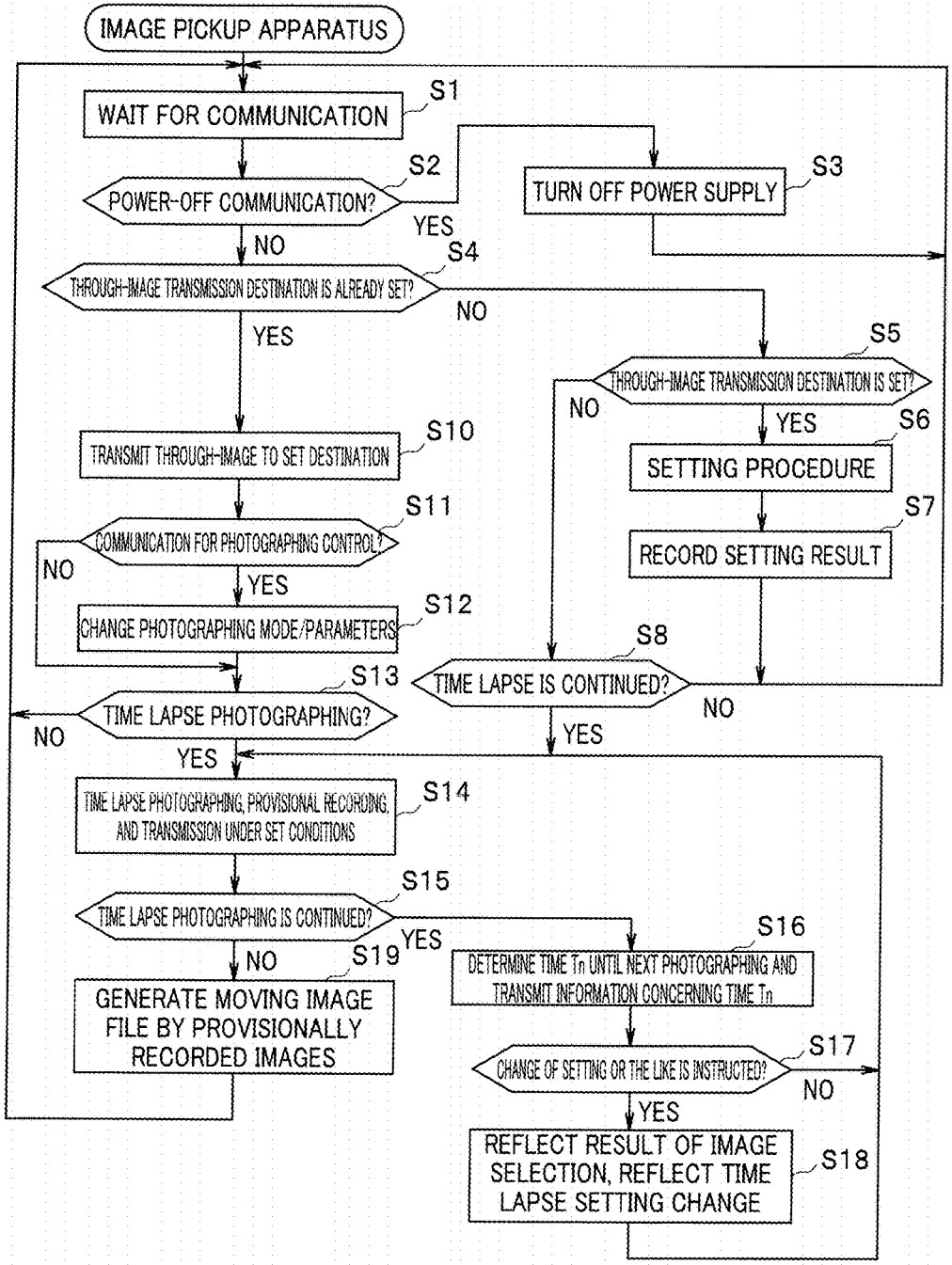
FIG. 2 is a flowchart for explaining operation of an image pickup apparatus 10.
Figure 3:
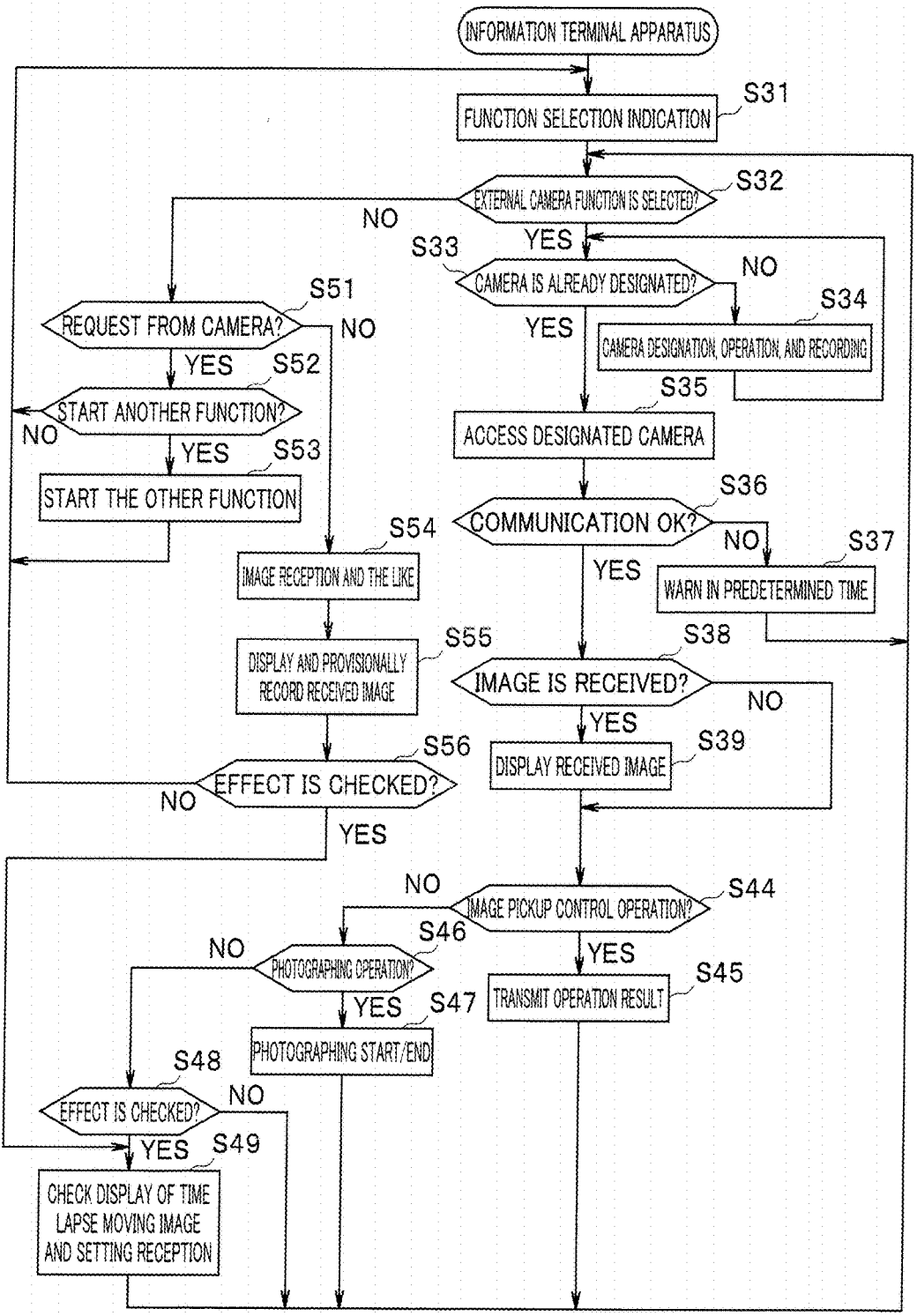
FIG. 3 is a flowchart for explaining operation of the information terminal apparatus 20.
Figure 4A:
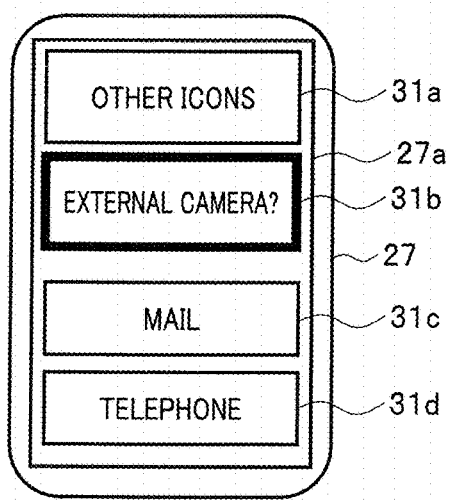
FIG. 4A is an explanatory diagram showing an example of an image displayed on a display screen of the information terminal apparatus 20.
Figure 4B:
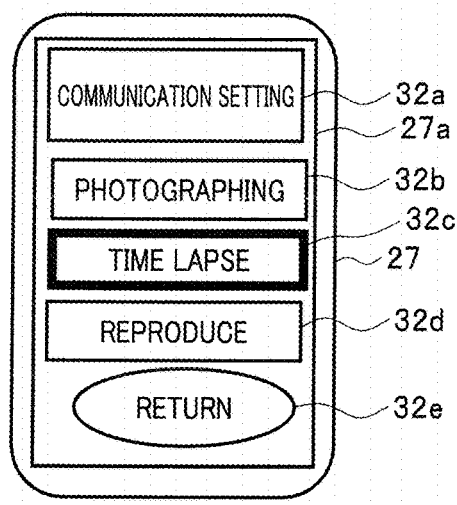
FIG. 4B is an explanatory diagram showing an example of an image displayed on the display screen of the information terminal apparatus 20.
Figure 5A:
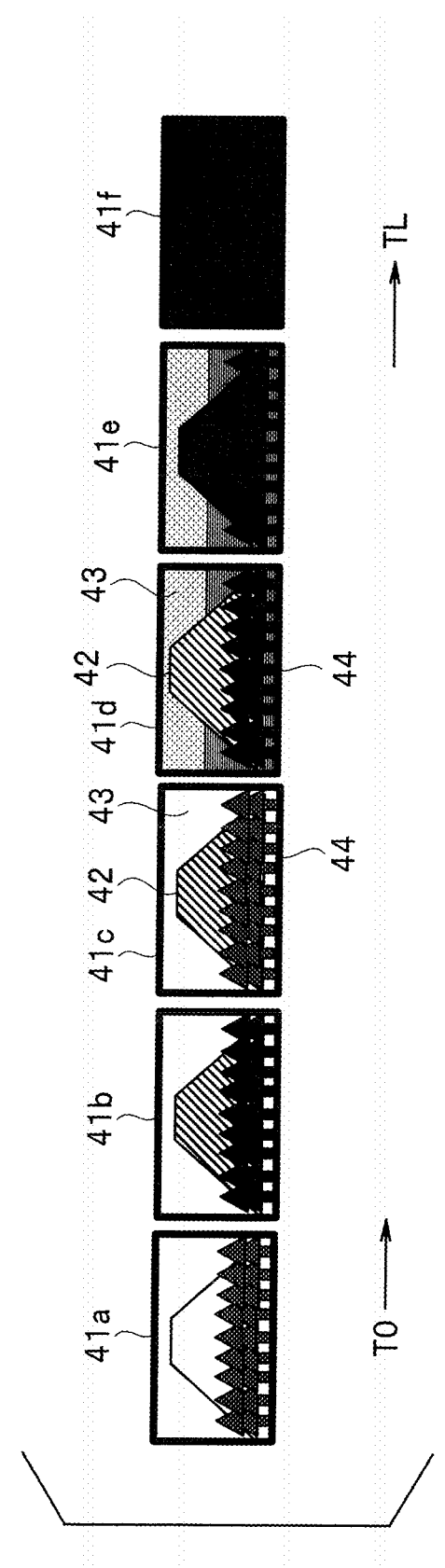
FIG. 5A is an explanatory diagram for explaining a time-lapse moving image.
Figure 6:
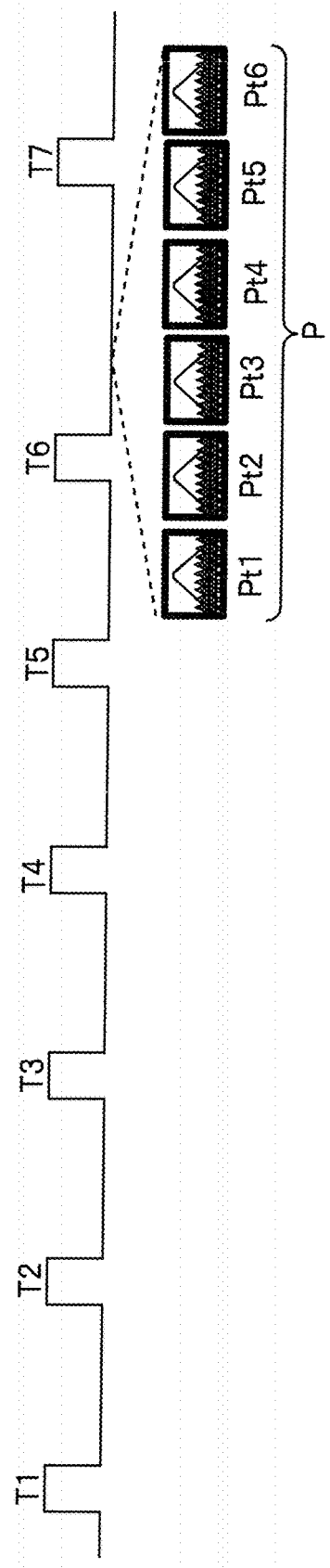
FIG. 6 is an explanatory diagram for explaining timing of processing in the embodiment.

Operations of the image pickup apparatus 10 and the information terminal apparatus 20 according to the embodiment configured as explained above are explained with reference to FIGS. 2 to 7. FIGS. 2 and 3 are respectively flowcharts for explaining the operations of the image pickup apparatus 10 and the information terminal apparatus 20. FIGS. 4A to 4E are explanatory diagrams showing examples of images displayed on the display screen of the information terminal apparatus 20. FIGS. 5A and 5B are explanatory diagrams for explaining time-lapse moving images. FIG. 6 is an explanatory diagram for explaining timing of processing in the present embodiment.

In step S31 in FIG. 3, the control section 21 of the information terminal apparatus 20 controls the display control section 26 to display function selection indication. Thereafter, in the next step S32, the control section 21 determines whether an external camera function is selected. FIG. 4A shows an example of function selection indication displayed on a display screen 27*a* of the display section 27. In the example shown in FIG. 4A, a selection button 31*a* for selecting other functions, an external camera button 31*b* for selecting the external camera function, a mail button 31*c* for selecting a mail function, and a telephone button 31*d* for selecting a telephone function are displayed on the display screen 27*a*.

It is assumed that the user touches the external camera button 31*b* and selects the external camera function. When determining in step S32 that the external camera function is not selected, the control section 21 shifts the processing to step S51 and determines presence or absence of a request from the external camera. When a request occurs, the control section 21 determines whether the request is a request for starting another function (step S52). When the request is the request for starting another function, the control section 21 starts the other function (step S53). When determining in step S52 that the start request for another function is absent, the control section 21 returns the processing to step S31. When determining in step S51 that a request from the external camera is absent, the control section 21 receives an image from the external camera in step S54 and subsequently displays the received image and provisionally records the received image (step S55). Subsequently, in step S56, the control section 21 determines whether operation for displaying check indication for checking an effect of the time-lapse photographing is performed by the user. When the operation is performed, the control section 21 shifts the processing to step S49. When the operation is not performed, the control section 21 returns the processing to step S31.

When the external camera function is selected, the control section 21 shifts the processing from step S32 to step S33 and determines whether the external camera is already designated. When the external camera is not designated, in the next step S34, the control section 21 receives camera designation operation for setting of wireless connection, setting of an ID and a password, and the like, records designated information in the recording section 24, and returns the processing to step S33.

When determining in step S33 that the external camera is already designated, in step S35, the control section 21 accesses the image pickup apparatus 10, which is the designated external camera, and causes the communication section 22 to establish communication with the communication section 16 of the image pickup apparatus 10. In the next step S36, the control section 21 determines whether the communication is established.

On the other hand, the control section 11 of the image pickup apparatus 10 is in a communication standby state in step S1 in FIG. 2. In the next step S2, the control section 11 determines whether power-off communication has occurred. When the power-off communication has occurred, the control section 11 turns off a power supply in step S3 and returns the processing to step S1.

When determining in step S2 that the power-off communication has not occurred, the control section 11 shifts the processing to step S4 and determines whether a destination of through-image transmission is already set. When the destination of the through-image transmission is already set, the control section 11 transmits a through-image to the destination of the communication (step S10) and proceeds to step S11. That is, the control section 11 gives an image pickup signal acquired by the image pickup section 12 to the signal processing section 18 and transmits a picked-up image after the signal processing from the communication section 16 to the information terminal apparatus 20 as the through-image.

When determining in step S36 that the communication is established, the control section 21 of the information terminal apparatus 20 receives the through-image with the communication section 22 (step S38). The control section 21 shifts to the next step S39, gives the through-image received via the communication section 22 to the display control section 26, and thereafter proceeds to step S44. In this way, the through-image acquired by the image pickup apparatus 10 is displayed on the display screen 27a of the display section 27. Note that, when not receiving an image in step S38, the control section 21 shifts the processing to step S44. When determining in step S36 that the communication is not established, the control section 21 performs a warning such as warning indication after elapse of a predetermined time (step S37) and thereafter returns the processing to step S32.

In the image pickup apparatus 10, when the destination of the through-image transmission is not set, in step S5, the control section 11 determines whether setting operation for the destination of the through-image transmission is performed. When the setting operation for the through-image transmission destination is performed, after performing a setting procedure in step S6, the control section 11 records setting information in the recording section 14 (step S7) and returns the processing to step S1.

Note that, in the image pickup apparatus 10, when the time-lapse photographing is already performed, the control section 11 shifts the processing from step S5 to step S14 through step S8 and continues the time-lapse photographing. Note that, when determining in step S8 that the time-lapse photographing is not continued, the control section 11 returns the processing to step S1.

In step S11, the control section 11 of the image pickup apparatus 10 determines whether communication for photographing control is performed. When photographing parameters, parameters of image processing, and the like from the information terminal apparatus 20 are received, the control section 11 shifts from step S11 to step S12, performs a change of a photographing mode and a change of the parameters, and proceeds to step S13. In step S12, parameters concerning the time-lapse photographing can also be set by the information terminal apparatus 20. When determining in step S11 that the communication for photographing control is not performed, the control section 11 shifts the processing to step S13.

It is assumed that the user performs photographing operation for the time-lapse photographing. The photographing operation can be performed not only by the operation section 19 of the image pickup apparatus 10 but also by the operation section 23 of the information terminal apparatus 20. For example, the control section 21 of the information terminal apparatus 20 can control the display control section 26 to display a mode selection screen shown in FIG. 4B. In an example shown in FIG. 4B, a communication setting button 32a for selecting a communication setting mode, a normal photographing button 32b for selecting a normal photographing mode, a time-lapse photographing button 32c for selecting a time-lapse photographing mode, a reproduction button 32d for selecting a reproduction mode, and a return button 32e for returning to a function selection screen are displayed on the display screen 27a.

It is assumed that the user touches the time-lapse photographing button 32c and selects the time-lapse photographing mode. In step S44, the control section 21 determines whether operation for photographing control is performed. When the image pickup control operation is not performed, the control section 21 shifts to step S46 and determines whether the photographing operation is performed. When operation for designating the time-lapse photographing mode is performed, the control section 21 shifts the processing from step S44 to step S45, transmits a result of the operation to the image pickup apparatus 10, and returns the processing to step S32.

Figure 4C:
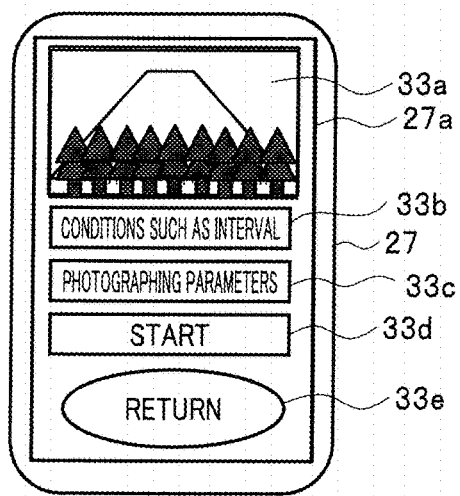
FIG. 4C is an explanatory diagram showing an example of an image displayed on the display screen of the information terminal apparatus 20.

FIG. 4C shows a setting menu screen for the time-lapse photographing displayed on the display screen 27a of the information terminal apparatus 20. In an example shown in FIG. 4C, through-image indication 33a, a condition setting button 33b for setting of photographing conditions such as a photographing interval of the time-lapse photographing, a photographing setting button 33c for designating a setting change of the photographing parameters, a time-lapse photographing start button 33d for instructing a photographing start of the time-lapse photographing, and a return button 33e are displayed on the display screen 27a. The user can change setting of the time-lapse photographing by performing operation on the condition setting button 33b.

Figure 4D:
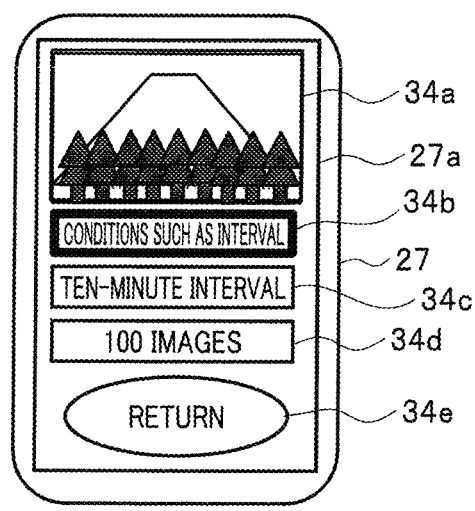
FIG. 4D is an explanatory diagram showing an example of an image displayed on the display screen of the information terminal apparatus 20.

FIG. 4D shows a time-lapse photographing setting screen displayed on the display screen 27a of the information terminal apparatus 20 according to operation of the condition setting button 33b. In an example shown in FIG. 4D, through-image indication 34a, indication 34b indicating the time-lapse photographing setting screen, an interval setting button 34c for setting a photographing interval, and a number-of-images setting button 34d for setting the number of photographed images are displayed on the display screen 27a. Note that present setting is shown during the display of the buttons 34c and 34d. In the example shown in FIG. 4D, as a condition of the time-lapse photographing, photographing of one hundred images at a ten-minute interval is set.

The user can set a photographing interval in the time-lapse photographing by touching the interval setting button 34c. The user can set the number of photographed images in the time-lapse photographing by touching the number-of-images setting button 34d. The control section 21 records the setting information based on the user operation (the information concerning the time lapse) in the recording section 24. In step S45, the control section 21 transmits the setting information to the image pickup apparatus 10. As explained above, the control section 11 of the image pickup apparatus 10 receives the setting information in step S12 and causes the time-lapse-information storing section 15 to store the setting information.

When finishing the setting of the time-lapse photographing, the user touches the return button 34e. Consequently, the display control section 26 returns the display to a state shown in FIG. 4C. It is assumed that the user touches the time-lapse photographing start button 33d shown in FIG. 4C to thereby instruct the time-lapse photographing. When the photographing operation is performed, the control section 21 shifts from step S46 to step S47, instructs photographing start and end, and returns the processing to step S32. That is, the control section 21 transmits a command for a photographing instruction of the time-lapse photographing to the control section 11 of the image pickup apparatus 10 via the communication sections 22 and 16. When determining in step S46 that the photographing operation is not performed, the control section 11 shifts the processing to step S48.

The control section 11 determines in step S13 whether the photographing instruction for the time-lapse photographing is received. The control section 11 shifts the processing to step S14 according to the photographing instruction for the time-lapse photographing from the information terminal apparatus 20. Note that, when an instruction for normal photographing is received rather than the time-lapse photographing, the normal photographing is performed (not shown in the figure).

In step S14, the control section 11 performs the time-lapse photographing under the set conditions. That is, the control section 11 controls the image pickup section 12 on the basis of the information concerning the photographing interval, the photographing time, and the like stored in the time-lapse-information storing section 15 and starts the time-lapse photographing.

An image obtained by the time-lapse photographing of the image pickup section 12 is supplied to the signal processing section 18. The predetermined signal processing is applied to the image. The control section 11 gives the picked-up image subjected to the signal processing by the signal processing section 18 to the provisional recording section 14a and records the image in the provisional recording section 14a. The control section 11 transmits the image obtained by the time-lapse photographing to the information terminal apparatus 20 via the communication sections 16 and 22. The information terminal apparatus 20 can generate, using the transmitted image, a time-lapse check moving image used for check indication.

Note that the control section 11 may transmit, every time a picked-up image is obtained by each photographing of the time-lapse photographing, the obtained picked-up image to the information terminal apparatus 20 or may transmit the picked-up image at predetermined timing. For example, when a display request for check indication including a time-lapse check moving image based on user operation is generated from the information terminal apparatus 20, the control section 11 may transmit the picked-up image according to a transmission instruction from the information terminal apparatus 20. The control section 11 may not only directly transmit the picked-up image but also transmit the picked-up image after converting the picked-up image into a reduced thumbnail image. The picked-up image recorded in the provisional recording section 14a and the picked-up image transmitted to the information terminal apparatus 20 may be compressed by the signal processing section 18.

In explanation of an example shown in FIG. 2, it is assumed that the picked-up image is transferred to the information terminal apparatus 20 and the time-lapse check moving image is displayed on the display screen 27a of the information terminal apparatus 20. However, the time-lapse check moving image may be displayed on a not-shown display section of the image pickup apparatus 10. In this case, it is unnecessary to transfer the picked-up image to the information terminal apparatus 20.

After the processing in step S14, in step S15, the control section 11 determines whether the time-lapse photographing is continued. When the time-lapse photographing ends, the control section 11 shifts to step S19, generates a moving image file formed by the provisionally recorded image, and returns the processing to step S1. When the time-lapse photographing is continued, in step S16, the control section 11 calculates time Tn until the next photographing in the time-lapse photographing, transmits information concerning the time to the information terminal apparatus 20 via the communication sections 16 and 22, and advances the processing to step S17.

The control section 21 of the information terminal apparatus 20 may receive, in step S54, the various kinds of information transmitted from the image pickup apparatus 10 or may receive the information at any timing after step S36 when the communication with the image pickup apparatus 10 is established. For example, the control section 21 gives the received information concerning the remaining time Tn until the next photographing to the recording section 24 and causes the recording section 24 to record the information.

The user checks quality of a time-lapse moving image obtained by the time-lapse photographing and changes, depending on the quality, the setting of the time-lapse photographing and the setting during the time-lapse moving image generation. In the present embodiment, the information terminal apparatus 20 is capable of performing the check and the setting change of the time-lapse moving image during the photographing of the time-lapse photographing. The control section 21 of the information terminal apparatus 20 can cause the display section 27 to display, on the basis of user operation, on the display screen 27a of the display section 27, a check and setting change menu screen (FIG. 4E) for the check and the setting change of the time-lapse moving image obtained by the time-lapse photographing of the image pickup apparatus 10. Note that the control section 21 may always display the check and setting change menu screen during the time-lapse photographing.

FIGS. 5A and 5B are explanatory diagrams for explaining time-lapse moving images formed by using images obtained by the time-lapse photographing. It is assumed that the user time-lapse photographs a scene to include a mountain 42 in the center, a relatively dark wood 44 in front of the mountain 42, and a relatively bright sky 43 behind the mountain 42 and enjoys changes of the scene from the morning until the night. In FIGS. 5A and 5B, a reproduction time from time T0 to time TL is plotted on a horizontal axis. Images 41a to 41f and 45a to 45h at predetermined photographing timings are shown. FIGS. 5A and 5B show, for example, time-lapse moving images obtained at the same frame rate. However, settings of the time-lapse photographing are different.

An example shown in FIG. 5A indicates that, in a predetermined moving image reproduction time TL, images 41a to 41f are obtained by photographing from the morning until the night. The user can sufficiently feel changes of the scenes with respect to elapse of time. On the other hand, an example shown in FIG. 5B indicate that, in the predetermined moving image reproduction time TL, the images 45a, 45b, and the like from the morning until a relatively bright time period are obtained. That is, changes of the images 45a, 45b, and the like are small. The user cannot sufficiently feel changes of the scenes with respect to the elapse of time. That is, FIG. 5B shows an example in which a photographing interval is too short compared with FIG. 5A. This indicates that, if photographing of the same number of images is performed in FIGS. 5A and 5B, the photographing ends before the night in FIG. 5B.

Figure 4E:
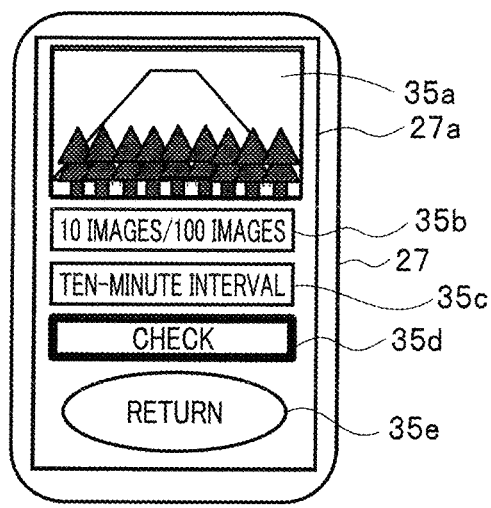
FIG. 4E is an explanatory diagram showing an example of an image displayed on the display screen of the information terminal apparatus 20.

FIG. 4E shows an example of a check and setting change menu screen displayed on the display screen 27a of the information terminal apparatus 20 during the time-lapse photographing. In the example shown in FIG. 4E, through-image indication 35a, setting indication 35b of a present number of photographed images of the time-lapse photographing, setting indication 35c of a present photographing interval of the time-lapse photographing, a check button 35d for shifting to a check mode for displaying check indication for checking quality of the time-lapse photographing, and a return button 35e are displayed on the display screen 27a. The user can cause the information terminal apparatus 20 to display the check indication of the time-lapse photographing by performing operation on the check button 35d.

In step S56 or step S48, the control section 21 of the information terminal apparatus 20 determines whether the check mode for causing the information terminal apparatus 20 to display check indication based on a time-lapse moving image and checking an effect of the check indication is designated. When the user touches the check button 35d and designates the check mode, the control section 21 shifts the processing to step S49, executes the check mode, and returns the processing to step S32. When determining in step S48 that the check mode is not designated, the control section 21 returns the processing to step S32.

Figure 4F:
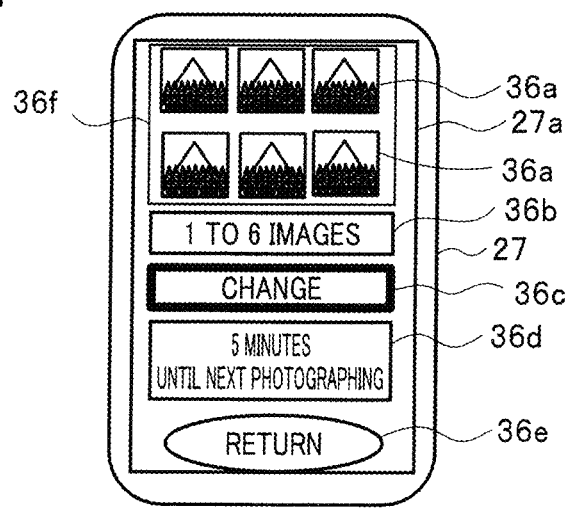
FIG. 4F is an explanatory diagram showing an example of an image displayed on the display screen of the information terminal apparatus 20.

FIG. 4F shows check indication displayed by the display control section 26. The display control section 26 can provide, in the check indication, a time-lapse check moving image display region for displaying a time-lapse check moving image based on a plurality of images of a time-lapse photographing result obtained to the present or a thumbnail display region for displaying a plurality of thumbnail images based on the plurality of images of the time-lapse photographing result obtained to the present (these regions are hereinafter referred to as check image display region 36f). In the time-lapse check moving image display region, a plurality of images obtained by the time-lapse photographing to the present are displayed as a moving image at an initially set frame rate or a frame rate recorded in the recording section 24 as a frame rate of the time-lapse moving image.

The display control section 26 may perform, in the check indication, instead of the time-lapse moving image check indication, thumbnail display of a plurality of images obtained by the time-lapse photographing. Note that FIG. 4F shows an example in which a thumbnail display region for displaying thumbnail images 36a based on a plurality of picked-up images obtained by the time-lapse photographing to the present is provided in the check indication.

An image switching button 36b for selecting an image not displayed in the thumbnail display region among images obtained by the time-lapse photographing to the present is displayed under the check image display region 36f. Indication indicating which images from a start of the time-lapse photographing the thumbnail images 36a displayed in the thumbnail display region are is displayed on the display of the image switching button 36b. The example shown in FIG. 4F indicates that first to sixth images are displayed in the thumbnail display region.

Note that, when displaying a time-lapse check moving image in the check image display region 36f, the display control section 26 may perform, instead of the image switching button 36b, indication indicating a total time of the time-lapse check moving image and a reproduction time from a moving image reproduction start under set conditions.

In the check indication, a setting change button 36c for instructing a change of setting, remaining time indication 36d indicating time until the next photographing, and a return button 36e are displayed. The control section 21 reads out the information concerning the remaining time Tn recorded in the recording section 24 and displays remaining time indication 36d. The user can grasp, according to the remaining time indication 36d, a remaining time for ending setting operation by the next photographing.

It is assumed that the user operates the setting change button 36c. Then, a time-lapse setting change screen shown in FIG. 4G is displayed by the display control section 26.

The user can designate and delete an image unnecessary as an image used for a time-lapse moving image and change setting of photographing conditions of the subsequent time-lapse photographing, that is, a photographing interval and the number of photographed images using the time-lapse setting change screen, which is adjustment indication. The user may changes the photographing conditions to cause a more dramatic image change or a less image change. That is, the user can instantaneously reflect a reproduction result on photographing and delete an image that the user is dissatisfied with. Therefore, it is possible to form a favorite moving image at an interval of photographing while performing various kinds of fine adjustment. This means that an edited moving image is finished simultaneously with a photographing end. Extraordinary contribution is possible in terms of effective time utilization of the user. For example, a photographing method for continuously performing bracket photographing and adopting, as a moving image, only good images among images photographed by the bracket photographing is included in a range covered by this application as long as the moving image can be checked as appropriate. A range of the moving image to be checked does not need to cover all frames. Only concerned portions can be designated such that the portions can be reproduced as a moving image. Such application is possible if the images are screened as thumbnails or a time bar is displayed to designate a range.

Figure 4G:
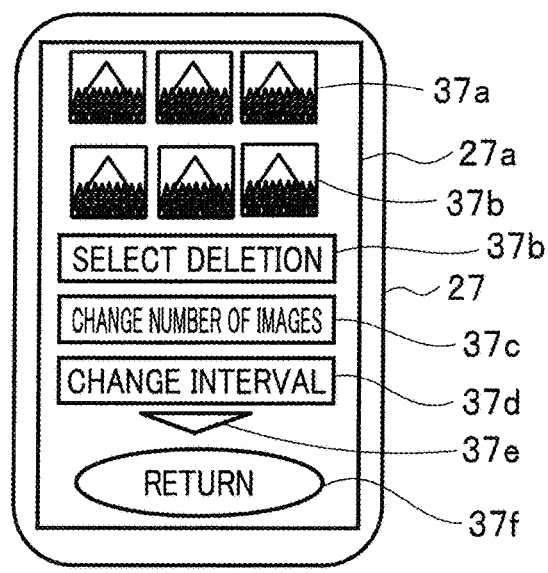
FIG. 4G is an explanatory diagram showing an example of an image displayed on the display screen of the information terminal apparatus 20.

The time-lapse setting change screen shown in FIG. 4G includes a region for displaying thumbnail images 37a based on images obtained by the time-lapse photographing to the present. A deletion selection button 37b, a number-of-images change button 37c, an interval change button 37d, an other setting button 37e, and a return button 37f are displayed on the time-lapse setting change screen shown in FIG. 4G.

By operating the deletion selection button 37b, the user can designate, with touch operation on the thumbnail images 37a, an image to be deleted. The control section 21 receives the deletion operation of the user and generates an instruction for deleting, from the recording section 24 and the provisional recording section 14a of the image pickup apparatus 10, picked-up images corresponding to the thumbnail images 37a designated as the image to be deleted.

In step S17 in FIG. 2, the control section 11 of the image pickup apparatus 10 determines whether a change instruction for setting and the like is generated. When receiving, from the information terminal apparatus 20, an instruction for deleting a picked-up image used in a time-lapse moving image, the control section 11 deletes the instructed picked-up image from the provisional recording section 14a (step S18). Note that, when all images used in the time-lapse moving image are not displayed in the time-lapse setting change screen, the user can display and select the remaining thumbnail images by operating the deletion selection button 37b.

When the number-of-images change button 37c is touched by the user, the display control section 26 displays not-shown number-of-images change indication. When the interval change button 37d is touched by the user, the display control section 26 displays not-shown interval change indication. Note that, instead of the number-of-images change indication and the interval change indication, the time-lapse photographing setting screen shown in FIG. 4D may be displayed. By operating the number-of-images change indication, the interval change indication, and the like, the user can change the setting of the number of photographed images and the photographing interval of the time-lapse photographing.

For example, when the user feels that a change of images is little from a result of checking a time-lapse check moving image based on images time-lapse photographed in the setting of the ten-minute interval, the user can perform setting for, for example, extending the photographing interval to a thirty-minute interval. Conversely, when the user feels that a change of the images is too intense from a result of checking the time-lapse check moving image based on the images time-lapse photographed in the setting of the ten-minute interval, the user can perform setting for, for example, narrowing the photographing interval to a three-minute interval.

When a setting change of the time-lapse photographing is instructed by the user, the control section 21 records information concerning the setting change in the recording section 24 and gives an instruction for the setting change to the control section 11 of the image pickup apparatus 10. In step S18 in FIG. 2, the control section 11 of the image pickup apparatus 10 causes the time-lapse-information storing section 15 to store the information concerning the number of photographed images and the photographing interval based on the user operation and reflects the information on the subsequent time-lapse photographing. Consequently, it is possible to prevent the subsequent photographing from being wasteful. Even if wasteful photographing is performed, in this application, it is possible to immediately perform retaking and replace the unsuccessful frames with successful frames by discarding unsuccessful frames.

FIG. 6 is an explanatory diagram for explaining respective photographing timings of the time-lapse photographing and timings of a check and a setting change of a time-lapse check moving image. In FIG. 6, time is plotted on the horizontal axis. Respective photographing timings T1, T2, and the like of the time-lapse photographing are indicated by a pulse waveform. For example, it is assumed that the user causes the information terminal apparatus 20 to display check indication for the time-lapse photographing after photographing at the timing T6. A time-lapse check moving image P obtained at the timing is generated using images Pt1 to Pt6 photographed and obtained at the timings T1 to T6. The user can check quality of a time-lapse moving image with the time-lapse check moving image P generated by the images Pt1 to Pt6.

For example, when the user feels with the time-lapse check moving image at this point in time that a change of a moving image is little, the user performs operation for extending the photographing interval. According to the operation, the control section 11 of the image pickup apparatus 10 controls the image pickup section 12 and extends the photographing interval of the time-lapse photographing. Consequently, as indicated at the timing T7 in FIG. 6, the next photographing is performed at an interval wider than the photographing interval before the timing T7. In this way, it is possible to perform, halfway in the time-lapse photographing, the check and the setting change for obtaining a time-lapse moving image satisfactory for the user.

In the example shown in FIG. 4G, when the other setting button 37e is touched, the control section 21 can perform other setting. For example, when the other setting button 37e is touched, the display control section 26 may display not-shown frame rate change indication. In an initial state, a frame rate used during the time-lapse moving image generation in the image pickup apparatus 10 may be adopted in the time-lapse check moving image in the check indication. According to user operation performed using the frame rate change indication, the control section 21 can change the frame rate of the time-lapse check moving image displayed in the check indication. Consequently, the user can view, while performing change operation of the frame rate, the time-lapse check moving image on which the change operation of the frame rate is reflected. When a satisfactory time-lapse check moving image is obtained by the change operation of the frame rate, the user may be able to set the frame rate in this case as a frame rate during the time-lapse moving image generation. When receiving the change operation of the frame rate by the user, the control section 21 records information concerning the frame rate in the recording section 24 and gives the information concerning the frame rate to the control section 11 of the image pickup apparatus 10. Consequently, the signal processing section 18 of the image pickup apparatus 10 can generate a time-lapse moving image at a frame rate designated by the user.

Note that, in the example shown in FIG. 4G, a change of the number of photographed images is designated. However, for example, a photographing end time may be set. When the other setting button 37e is touched, setting change of the photographing parameters during the time-lapse photographing may be able to be performed.

In the above explanation, in the time-lapse photographing, photographing is performed at a constant time interval. However, when an apparatus that performs the time-lapse photographing at an interval based on predetermined condition setting is adopted, conditions of timing for performing the time-lapse photographing may be able to be changed on the time-lapse photographing setting screen shown in FIG. 4G. The time-lapse photographing is performed not only in a predetermined period and at a predetermined time interval determined in advance. The predetermined period may be able to be changed, for example, halfway or immediately after the photographing. The photographing interval does not need to be inflexibly constant. This is because the present invention has a characteristic in that it is possible to switch control of the period and the time interval while checking an effect of a moving image as appropriate.

In this way, in the present embodiment, halfway in the photographing of the time-lapse photographing, the time-lapse check moving image is generated using a photographing result of the time-lapse photographing performed to that point to make it possible to check quality of the time-lapse photographing. The setting change of the time-lapse photographing by the user is received to perform photographing on which the setting change is reflected. Consequently, the user is capable of easily obtaining a desired time-lapse moving image.

In the time-lapse photographing, in general, a relative long time is present between photographing and photographing. A sufficient setting time can be secured between the photographing and the photographing. By performing the check and the setting change during a free time, the user can obtain a desired image by performing the time-lapse photographing once.

Processing for the check of quality and the setting change of the time-lapse photographing is performed in the information terminal apparatus different from the photographing apparatus. Therefore, an advantage exists that the time-lapse photographing is not affected because of these kinds of processing. Even when the processing for the check of quality and the setting change of the time-lapse photographing is performed in the image pickup apparatus, time until the next photographing is displayed to cause the user to recognize time remaining for setting work to prevent the next photographing from being hindered. The user can perform work at ease.

The signal processing section may control a reproduction frame rate such that the entire time-lapse check moving image of the check indication ends in the remaining time until the next photographing.

The example is explained in which the photographing interval and the number of photographed images are directly designated in the check indication. However, an appropriate photographing interval and an appropriate number of photographed images may be automatically set according to user operation by indication for, for example, increasing movements or reducing movements. For example, when a button for increasing movements is displayed and the button is operated, setting for, for example, reducing the photographing interval and increasing the number of photographed images not to change an entire photographing time may be automatically performed. Alternatively, an optimum photographing interval and an optimum number of photographed images may be automatically set according to setting for, for example, increasing speed of a movement to a double or reducing the speed to one third. That is, the time-lapse photographing is performed not only in a predetermined period and at a predetermined time interval determined in advance. The predetermined period can be changed, for example, halfway or immediately after the photographing. The photographing interval does not need to be inflexibly constant. According to the present invention, it is possible to switch control of the period and the time interval while checking an effect of a moving image as appropriate.

Further, movements of respective portions of an image may be determined by an image analysis. Screening of images used for the time-lapse moving image generation may be automatically performed on the basis of a determination result. When models optimum for respective scenes are present as a time-lapse moving image, the screening of the images may be automatically performed by analyzing the scenes with the image analysis and comparing the scenes with the models of the scenes according to an analysis result. For example, in the case of scenes shown in FIGS. 5A and 5B, it may be determined according to a change in an overall luminance average value that unnecessary images are photographed as the time-lapse moving image. In this case, an appropriate image may be selected and deleted. The number of photographed images may be automatically controlled to be increased in order to extend a photographing period.

Second Embodiment

Figure 7:
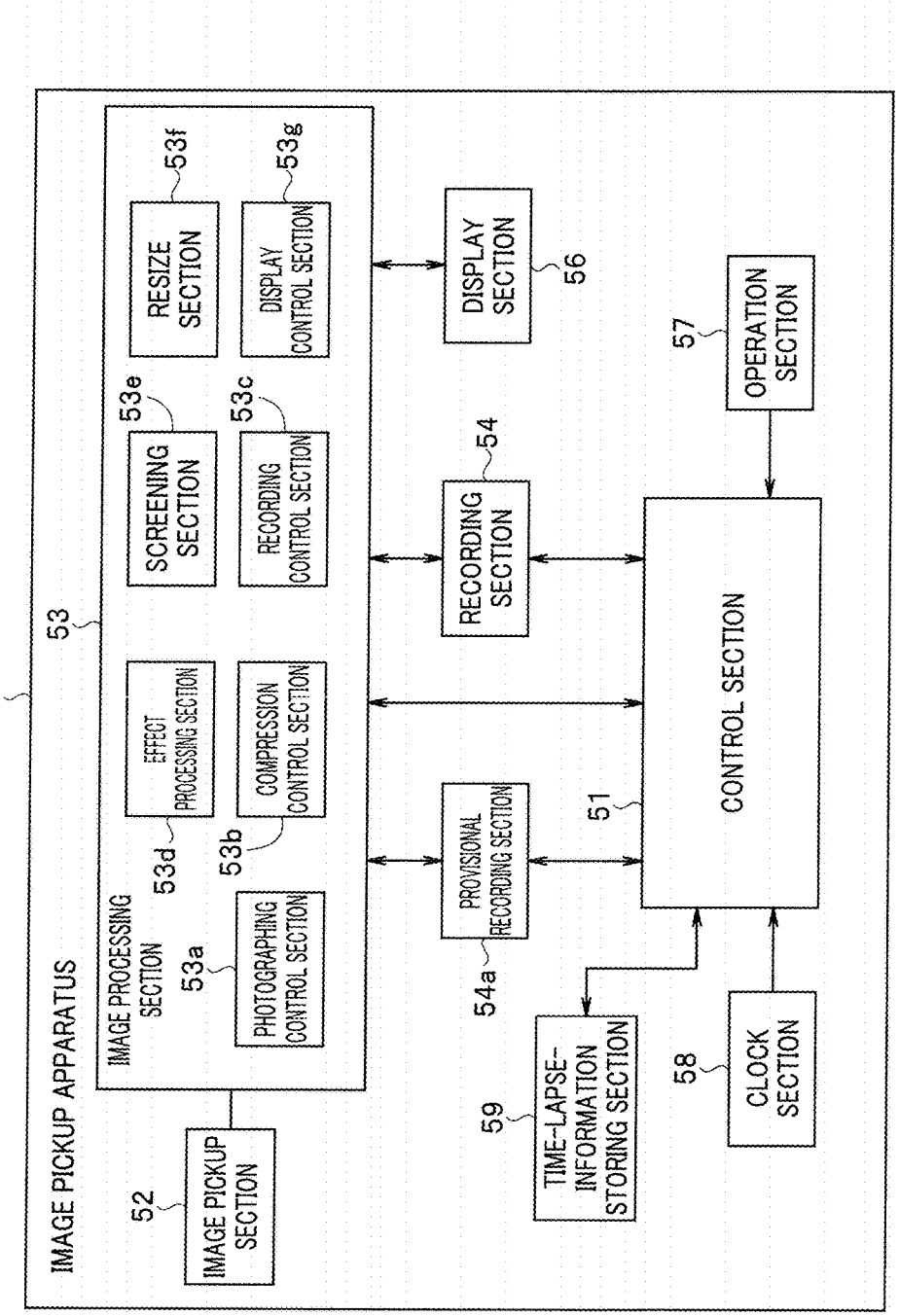
FIG. 7 is a block diagram showing an image pickup apparatus according to a second embodiment of the present invention.

FIG. 7 is a block diagram showing an image pickup apparatus according to a second embodiment of the present invention. The present embodiment indicates an example in which a check of quality and a setting change of time-lapse photographing are enabled by only the image pickup apparatus. That is, an image pickup apparatus 50 in the present embodiment includes a configuration the same as both of the image pickup apparatus 10 and the information terminal apparatus 20 shown in FIG. 1.

In FIG. 7, the image pickup apparatus 50 includes an image pickup section 52 configured by an image pickup device such as a CCD or a CMOS sensor. A not-shown lens is provided in the image pickup section 52. An object optical image is guided via the lens. The lens may be a lens including zooming and focusing functions. The image pickup section 52 converts, with the image pickup device, the object optical image into an electric signal and obtains an image pickup signal. The image pickup signal is supplied to an image processing section 53.

A control section 51 is provided in the image pickup apparatus 50. The control section 51 controls sections of the image pickup apparatus 50. The control section 51 may be configured by a not-shown processor such as a CPU and may operate according to a computer program stored in a not-shown memory. The image pickup apparatus 50 includes an operation section 57 including a shutter button, function buttons, and various switches for photographing mode setting and the like provided in a housing of the image pickup apparatus 50. The operation section 57 receives user operation and outputs an operation signal based on the user operation to the control section 51. The control section 51 can control a photographing control section 53a in the image processing section 53 on the basis of the operation signal outputted from the operation section 57. The photographing control section 53a is controlled by the control section 51 to be capable of generating a focus signal and a zoom signal and driving the lens of the image pickup section 52 to perform zooming, focusing, and the like. The photographing control section 53a can output a driving signal for the image pickup device to the image pickup section 52 to control shutter speed, an exposure time, and the like.

The control section 51 can control the photographing control section 53a to cause the image pickup section 52 to perform photographing at a predetermined time interval and execute time-lapse photographing for performing reproduction in a shorter time than a photographing time. Note that the photographing parameters of the time-lapse photographing, for example, information concerning a photographing interval and a photographing time are stored in a time-lapse-information storing section 59. The control section 51 reads out the information stored in the time-lapse-information storing section 59 and controls the time-lapse photographing.

The control section 51 can supply a picked-up image outputted from the image pickup section 52 to the image processing section 53. The image processing section 53 performs predetermined signal processing, for example, color adjustment processing, matrix conversion processing, noise removal processing, and other various kinds of signal processing on the read-out picked-up image.

A recording section 54 and a provisional recording section 54a are provided in the image pickup apparatus 50. A recording control section 53c is provided in the image processing section 53. The recording control section 53c is controlled by the control section 51 to control recording in and reproduction from the recording section 54 and the provisional recording section 54a. The control section 51 can give the picked-up image subjected to the signal processing by the image processing section 53 to the recording section 54 or the provisional recording section 54a and cause the recording section 54 or the provisional recording section 54a to record the picked-up image. For example, the control section 51 can give a picked-up image acquired in a normal photographing mode to the recording section 54 and cause the recording section 54 to record the picked-up image. The control section 51 can give a picked-up image from the image pickup section 52 acquired in a time-lapse photographing mode to the provisional recording section 54a and cause the provisional recording section 54a to provisionally record the picked-up image.

The image processing section 53 is controlled by the control section 51 to arrange the picked-up image recorded in the provisional recording section 54a on a time line to be capable of generating a time-lapse moving image. Note that information concerning a frame rate necessary for the generation of the time-lapse moving image is stored in the time-lapse-information storing section 59. The control section 51 reads out the information stored in the time-lapse-information storing section 59 and controls the generation of the time-lapse moving image.

A compression control section 53b is provided in the image processing section 53. The compression control section 53b is controlled by the control section 51. The compression control section 53b can perform compression processing when an image file of a picked-up image, a time-lapse moving image, or the like is recorded. An image after the compression processing can be recorded in the recording section 54 and the provisional recording section 54a.

A display control section 53g is provided in the image processing section 53. The display control section 53g executes various kinds of processing concerning display. The display control section 53g is controlled by the control section 51 to control display of a display section 56. The display section 56 includes a display screen such as an LCD and displays an image given from the display control section 53g. For example, the control section 51 can control the display control section 53g to display a through-image or a reproduced image of a picked-up image on the display screen of the display section 56. Further, in the present embodiment, the control section 51 controls the display control section 53g to display check indication including a time-lapse check moving image on the display screen of the display section 56. In order to change the time-lapse check moving image to a desired movie, the control section 51 can display adjustment indication for adjusting various parameters used for the time-lapse photographing and the time-lapse moving image generation of the image pickup apparatus 50 and designating an image (an image to be deleted) not used for the time-lapse moving image generation.

A touch panel functioning as the operation section 57 may be provided on the display screen of the display section 56. The touch panel can generate an operation signal corresponding to a position on the display screen pointed by the user with a finger. The operation signal is supplied to the control section 51. Consequently, when the user touches the display screen or slides the finger on the display screen, the control section 51 can detect the operation. That is, the control section 51 can detect various kinds of operation such as operation of a touch position of the user, operation for closing and separating fingers (pinch operation), slide operation, and operation of a position to which the finger reaches according to the slide operation, a sliding direction, and a period in which the finger touches the display screen. The control section 51 can execute processing corresponding to the user operation.

The control section 51 stores, in the time-lapse-information storing section 59, information concerning setting values of parameters by user operation on the adjustment indication. A screening section 53e is provided in the image processing section 53. The screening section 53e deletes, to exclude an image based on deletion operation of the user from generation of a time-lapse moving image, the image recorded in the provisional recording section 54a. Consequently, the image processing section 53 generates, according to the parameters based on the user operation, a time-lapse moving image using images not deleted by the user operation. Check indication including a time-lapse check moving image based on the time-lapser moving image is displayed on the display screen of the display section 56. That is, the user can change the time-lapse check moving image to a desired movie while viewing the check indication. That is, the user can visually match the time-lapse check moving image with preference of the user.

Note that a resize section 53f is also provided in the image processing section 53. The resize section 53f can reduce the time-lapse moving image and obtain thumbnail images. The thumbnail images can be used as images for check indication and adjustment indication. An effect processing section 53d is also provided in the image processing section 53. The effect processing section 53d can apply predetermined image effect processing to an image obtained by normal photographing and an image obtained by the time-lapse photographing.

The control section 51 receives a change of information concerning time lapse by the user until the time-lapse photographing ends. At a stage when the time-lapse photographing ends, the control section 51 causes the image processing section 53 to generate a time-lapse moving image based on a series of images recorded in the provisional recording section 54a, gives the time-lapse moving image to the recording section 54, and records the time-lapse moving image as a moving image file.

Figure 8:
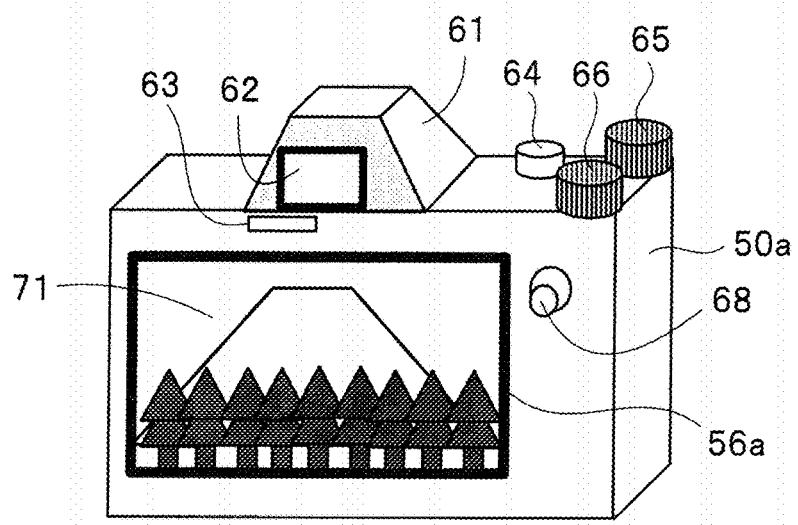
FIG. 8 is an explanatory diagram showing an example of an exterior of the image pickup apparatus 50.

FIG. 8 is an explanatory diagram showing an example of an exterior of the image pickup apparatus 50. As shown in FIG. 8, a not-shown lens barrel is provided on a front surface of a housing 50a of the image pickup apparatus 50. A lens section of the image pickup section 52 is housed in the lens barrel. In the image pickup apparatus 50, a finder section 61 may be provided on an upper surface of the housing 50a. An eye sensor 63, which detects that the user brings eyes close to the finder section 61, may be provided near the finder section 61. The eye sensor 63 detects that the user brings the eyes close to the finder section 61 and outputs a detection result to the control section 51. In this case, the display control section 53g may be able to switch, according to the detection result of the eye sensor 63, an output destination of an image between the display section 56 and an LCD or the like configuring the finder section 61.

A shutter button 64 and two dial operation sections 65 and 66 are disposed on an upper surface of the housing 50a as the operation section 57. A PICT button 68 is disposed on a rear surface of the housing 50a. In a state in which the user holds the image pickup apparatus 50, for example, the user not only can depress the shutter button 64 with an index finger but also can easily operate the dial operation section 66 with a thumb of a right hand and easily operate the dial operation section 65 with the index finger while looking through the finder section 61. The user can also instruct predetermined effect processing by operating the PICT button 68. The effect processing section 53d applies image effect processing corresponding to user operation to a picked-up image and the like.

Figure 9:
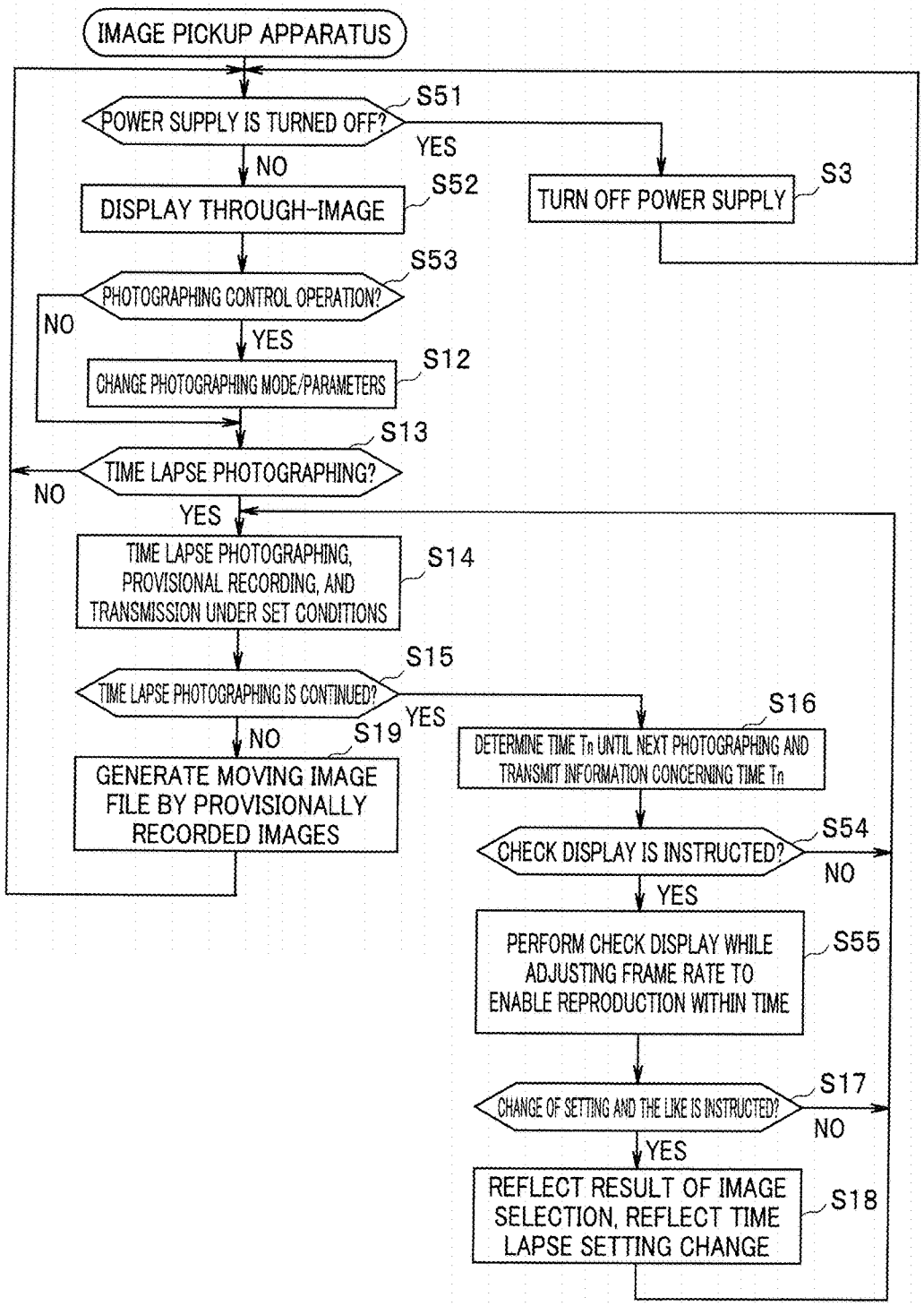
FIG. 9 is a flowchart for explaining operation of the image pickup apparatus according to the second embodiment.

Operation of the image pickup apparatus according to the embodiment configured as explained above is explained with reference to FIG. 9. FIG. 9 is a flowchart for explaining the operation of the image pickup apparatus according to the second embodiment. In FIG. 9, steps the same as the steps in FIG. 3 are denoted by the same reference numerals and signs and explanation of the steps is omitted.

In step S51 in FIG. 9, the control section 51 of the image pickup apparatus 50 determines whether power-off operation is performed. When the power-off operation is performed, the control section 51 turns off a power supply in step S3 and returns the processing to step S51.

If the power-off operation is not performed, the control section 51 displays a through-image in step S52 and proceeds to step S53. That is, the control section 51 gives an image pickup signal acquired by the image pickup section 52 to the image processing section 53. The display control section 53g causes the display section 56 to display a picked-up image after the signal processing on the display screen of the display section 56 as the through-image. In this way, the through-image acquired by the image pickup section 52 is displayed on a display screen 56a of the display section 56.

In step S53, the control section 51 of the image pickup apparatus 50 determines whether photographing control operation is perforated. When setting operation for photographing parameters, parameters of image processing, and the like is performed by the user, in step S12, the control section 51 performs a change of a photographing mode and a change of the parameters. In step S12, the control section 51 can also perform setting of parameters concerning the time-lapse photographing. For example, the control section 51 can receive setting operation for the parameters concerning the time-lapse photographing by the user by causing the display section 56 to display a time-lapse photographing setting screen the same as the display shown in FIG. 4D on the display screen of the display section 56. Note that information concerning the setting change concerning the time-lapse photographing by the user is stored in the time-lapse-information storing section 59. Note that, when the photographing control operation is not performed, the control section 51 shifts the processing from step S53 to step S13.

It is assumed that the user performs photographing operation of the time-lapse photographing. When detecting operation for starting the time-lapse photographing in step S13, the control section 51 shifts the processing to step S14 and starts the time-lapse photographing according to a photographing instruction for the time-lapse photographing. Note that, when normal photographing is instructed rather than the time-lapse photographing, the normal photographing is performed (not shown in the figure).

The control section 51 controls the image pickup section 52 on the basis of the information concerning the photographing interval, the photographing time, and the like stored in the time-lapse-information storing section 59 and starts the time-lapse photographing. An image obtained by the time-lapse photographing of the image pickup section 52 is supplied to the image processing section 53. Predetermined signal processing is applied to the image. The control section 51 gives the picked-up image subjected to the signal processing by the image processing section 53 to the provisional recording section 54a and records the picked-up image in the provisional recording section 54a.

The control section 51 determines in step S15 whether the time-lapse photographing is continued. When the time-lapse photographing is continued, in step S16, the control section 51 calculates the remaining time Tn until the next photographing in the time-lapse photographing.

It is assumed that the user checks quality of a time-lapse moving image obtained by the time-lapse photographing and changes, depending on the quality, setting of the time-lapse photographing and setting during time-lapse moving image generation. The control section 51 shifts to step S54 after the processing in step S16. In the present embodiment, in step S54, the control section 51 determines whether display operation for check indication for a check and a setting change of a time-lapse moving image halfway in photographing of the time-lapse photographing is performed. When an instruction for the check indication by the user is not generated, the control section 51 returns the processing from step S54 to step S14.

When the instruction for the check indication by the user is generated, the control section 51 controls the image processing section 53 and, in step S55, adjusts a frame rate to enable a check of a time-lapse moving image obtained by the time-lapse photographing of the image pickup apparatus 50 within the remaining time Tn and generates a time-lapse check moving image. The display control section 53g causes the display section 56 to display the time-lapse check moving image on the display screen 56a of the display section 56. Note that, in the present embodiment, the image processing section 53 generates the time-lapse check moving image using images obtained by the time-lapse photographing performed until the display instruction for the check indication. In FIG. 9, the control section 51 is explained as adjusting the frame rate such that reproduction of the time-lapse check moving image ends within the remaining time Tn. However, the control section 51 may adopt an initial frame rate determined in advance or a frame rate stored in the time-lapse-information storing section 59 and generate the time-lapse check moving image.

FIG. 8 shows an example in which a time-lapse check moving image 71 is displayed on the display screen 56a. The user can determine, with the time-lapse check moving image on the display screen 56a, whether photographing with which the user can obtain a desired image is performed. Note that the display control section 53g may display the time-lapse check moving image according to indication the same as the check indication shown in FIG. 4F.

It is assumed that the user checks the time-lapse check moving image and desires a change of setting. In this case, the display control section 53g causes the display section 56 to display adjustment indication the same as the adjustment indication shown in FIG. 4G to receive a setting change by the user. Consequently, the user can perform selection of an image not used for the generation of a time-lapse moving image and adjustment of the photographing interval, the number of photographed images, a frame rate, and the like. The control section 51 causes the time-lapse-information storing section 59 to store setting information obtained by the adjustment by the user. If enough time until the next photographing exists, the control section 51 may cause the display section 56 to display a time-lapse check moving image on which the setting change is reflected.

If the change of the setting of the time-lapse photographing is received and reflected on the subsequent time-lapse photographing, for example, it is possible to take measures beforehand against a problem in that, depending on the setting of the time interval and the like during the time-lapse photographing and the setting of the frame rate during the time-lapse moving image generation, a change of images of a time-lapse moving image is too fast or too slow and a time-lapse moving image satisfactory for the user cannot be obtained. The time-lapse photographing can be performed not only in a predetermined period and at a predetermined time interval determined in advance. The predetermined period may be able to be changed to, for example, a period halfway or immediately after the photographing. The photographing interval does not need to be inflexibly constant. This is because the present invention has a characteristic in that it is possible to switch control of the period and the time interval while checking an effect of a moving image as appropriate.

In step S17, the control section 51 of the image pickup apparatus 50 determines whether a change instruction for setting and the like is generated. When deletion operation for a picked-up image used in a time-lapse moving image is generated, the control section 51 deletes the instructed picked-up image from the provisional recording section 54a (step S18). When a setting change for the time-lapse photographing by the user is instructed, the control section 51 records information concerning the setting change in the time-lapse-information storing section 59 and gives an instruction for the setting change to the image processing section 53. In step S18, the control section 51 reads out the information concerning the number of photographed images and the photographing interval based on the user operation from the time-lapse-information storing section 59 to reflect on the subsequent time-lapse photographing. Consequently, it is possible to prevent the subsequent photographing from being wasted.

The other configuration and action are the same as the configuration and the action in the first embodiment.

Although not repeatedly explained in detail, concerning the present embodiment, some parts are already explained in the first embodiment.

In this way, in the present embodiment, an effect the same as the effect in the first embodiment is obtained.

Note that, in the embodiments, an advantage also exists that it is possible to finely adjust, halfway in the time-lapse photographing, a reproduction time of a time-lapse moving image to be generated. In the time-lapse photographing, since a recording time and a reproduction time are different, in some case, sound collected during the time-lapse photographing is not used and sound is composed after generation of a time-lapse moving image. In this case, if length of a sound signal is known, by changing conditions of the time-lapse photographing such that a reproduction time of the time-lapse moving image coincides with the length, it is also possible to easily create a time-lapse moving image in which time periods of a moving image and sound are matched. That is, the time-lapse photographing can be performed not only in a predetermined period and at a predetermined time interval determined in advance. The predetermined period may be able to be changed, for example, halfway or immediately after the photographing. The photographing interval does not need to be inflexibly constant. According to the present invention, it may be possible to switch control of the period and the time interval while checking an effect of a moving image as appropriate. Further, a frame rate and the like during moving image reproduction may also be changed according to necessity. A moving image to be obtained can be checked halfway in the photographing. Therefore, the frame rate may be able to be adjusted every time the moving image is checked. The moving image may be changed to slow or fast halfway to make it possible to change a specific frame rate. Consequently, flexibility of a contrivance for performing switching of the next photographing and obtaining a favorite photographing result is increased. It is possible to perform effective photographing continuation.

Third Embodiment

Figure 10:
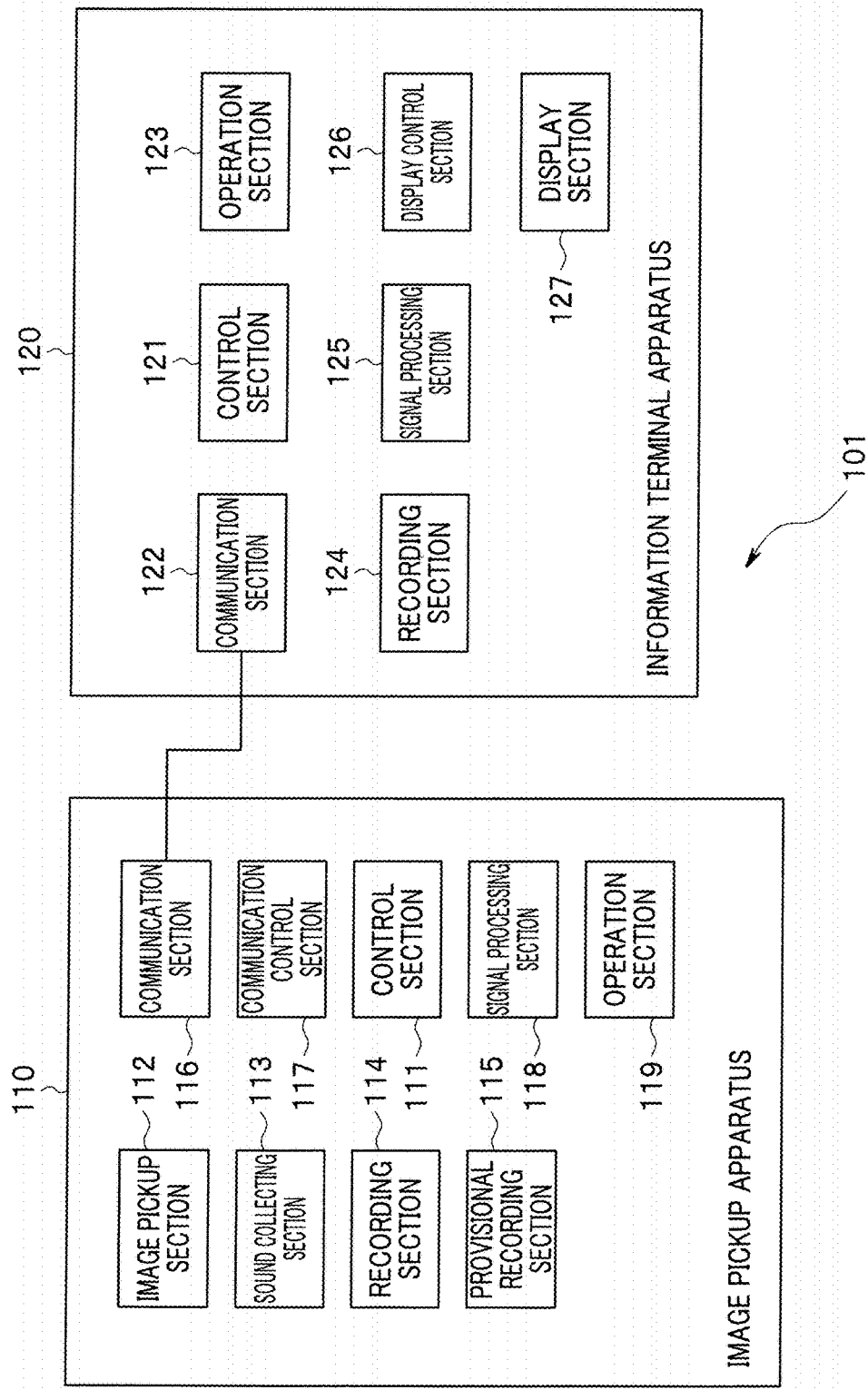
FIG. 10 is a block diagram showing a circuit configuration of an image-information processing system configured by an image pickup apparatus and an information terminal apparatus according to a third embodiment of the present invention.

FIG. 10 is a block diagram showing a circuit configuration of an image-information processing system configured by an image pickup apparatus and an information terminal apparatus according to a third embodiment of the present invention.

An image acquired in an image pickup section is transferred to the information terminal apparatus in the present embodiment. The information terminal apparatus makes it possible to adjust parameters for obtaining the image on the basis of user operation. By presenting the image after the adjustment, the information terminal apparatus enables a user to easily acquire a desired image. In the present embodiment, the image-information processing system is obtained that enables the user to acquire a desired image at an end point in time of time-lapse photographing by appropriately carrying out setting of parameters from the information terminal apparatus in the image pickup section.

In FIG. 10, an image-information processing system 101 in the present embodiment is configured by an image pickup apparatus 110 and an information terminal apparatus 120. The image pickup apparatus 110 can be configured by a photographing apparatus such as a digital camera. The image pickup apparatus 110 includes an image pickup section 112 configured by an image pickup device such as a CCD or a CMOS sensor. A not-shown lens is provided in the image pickup section 112. An object optical image is guided via the lens. The lens may be a lens including zooming and focusing functions. The image pickup section 112 converts, with the image pickup device, the object optical image into an electric signal and obtains an image pickup signal.

A control section 111 is provided in the image pickup apparatus 110. The control section 111 controls sections of the image pickup apparatus 110. The control section 111 may be configured by a not-shown processor such as a CPU and may operate according to a computer program stored in a not-shown memory. The image pickup apparatus 110 includes an operation section 119 including a shutter button, function buttons, and various switches for photographing mode setting and the like, which are not shown in the figure, provided in a housing of the image pickup apparatus 110. The operation section 119 receives user operation and outputs an operation signal based on the user operation to the control section 111. The control section 111 can generate a focus signal and a zoom signal on the basis of the operation signal outputted from the operation section 119 and drive the lens of the image pickup section 112 to perform zooming, focusing, and the like.

The control section 111 can output a driving signal for the image pickup device to the image pickup section 112 to control shutter speed, an exposure time, and the like. In this way, the control section 111 can control the lens and the image pickup device and adjust exposure during photographing.

The control section 111 can control the image pickup section 112, perform photographing at a predetermined time interval, and also perform time-lapse photographing for performing reproduction in a shorter time than a photographing time.

The control section 111 can read out a picked-up image outputted from the image pickup section 112 and supply the picked-up image to a signal processing section 118. The signal processing section 118 performs predetermined signal processing, for example, color adjustment processing, matrix conversion processing, noise removal processing, and other various kinds of signal processing on the read-out picked-up image.

The control section 111 controls the image pickup section 112 and the signal processing section 118, performs photographing of a plurality of images while changing exposure, and selects and combines picked-up images conforming to predetermined parameters. Consequently, the control section 111 can also perform high-dynamic range (HDR) photographing for expanding a dynamic range and suppressing white void and black solid.

A communication section 116 is provided in the image pickup apparatus 110. A communication section 122 is provided in the information terminal apparatus 120. The communication section 116 is controlled by a communication control section 117 to perform transmission and reception of information to and from the communication section 122 of the information terminal apparatus 120 via a predetermined transmission line. Commands and parameters are transferred to the control section 111 from the information terminal apparatus 120 via the communication section 116. The control section 111 can control the sections according to the transferred commands and parameters.

The communication control section 117 is controlled by the control section 111 to be capable of transmitting an image picked up by the image pickup apparatus 110 to the communication section 122 of the information terminal apparatus 120 via the communication section 116.

A recording section 114 and a provisional recording section 115 are provided in the image pickup apparatus 110.

The control section 111 can give the picked-up image subjected to the signal processing by the signal processing section 118 to the recording section 114 or the provisional recording section 115 and record the picked-up image in the recording section 114 or the provisional recording section 115. For example, the control section 111 can give a picked-up image acquired in a normal photographing mode to the recording section 114 and record the picked-up image in the recording section 114. The control section 111 can give a picked-up image from the image pickup section 112 acquired in a time-lapse photographing mode and an image after image processing such as HDR (hereinafter referred to as processed image) to the provisional recording section 115 and provisionally record the picked-up image and the processed image in the provisional recording section 115.

Note that the image processing is not limited to the HDR. This application is applicable to various kinds of special effect processing as well. As image processing complicated in processing after photographing and performed using a photographing result of a plurality of images, a variety of kinds of processing exist, such as conversion into 3D, super-resolution processing for performing composition for increasing an information amount of an image while changing positions of pixels, depth composition processing for composing a focused image using focused images in respective parts obtained by changing a focus position, and comparative light composition processing. The present invention can be effectively applied to the image processing. In the HDR, processing for, for example, switching an exposure condition on a real time basis during image pickup is added. Therefore, a characteristic in that an effect is conspicuous exists. Naturally, only a method of composition may be changed without changing the exposure condition. The present invention is a technique effective for all of these kinds of image processing.

Note that the image pickup apparatus 110 includes a sound collecting section 113. The sound collecting section 113 is configured by a not-shown microphone or the like. The sound collecting section 113 can convert ambient sound into a sound signal and output the sound signal to the signal processing section 118. The signal processing section 118 can apply predetermined signal processing to the sound signal outputted from the sound collecting section 113 and thereafter give the sound signal to the recording section 114 and the provisional recording section 115. The control section 111 can record collected sound in association with a picked-up image acquired at timing corresponding to the sound collection.

The information terminal apparatus 120 can be configured by a smartphone, a tablet PC, or the like. The information terminal apparatus 120 includes a control section 121. The control section 121 controls respective sections of the information terminal apparatus 120. The control section 121 may be configured by a not-shown processor such as a CPU and may operate according to a computer program stored in a not-shown memory. The information terminal apparatus 120 includes an operation section 123 including not-shown switches and the like provided on a housing of the information terminal apparatus 120. Note that the operation section 123 can be configured by a software keyboard or the like obtained by a computer program executed by the control section 121 or can be configured by a not-shown touch panel or the like provided in a display section 127 explained below.

The operation section 123 receives user operation and outputs an operation signal based on the user operation to the control section 121. The control section 121 controls the respective sections on the basis of the operation signal outputted from the operation section 123.

A recording section 124 is provided in the information terminal apparatus 120. The recording section 124 can record information given from the control section 121. A display control section 126 is provided in the information terminal apparatus 120. The display control section 126 executes various kinds of processing concerning display.

In the present embodiment, a signal processing section 125 is provided in the information terminal apparatus 120. The signal processing section 125 is controlled by the control section 121 to execute various kinds of signal processing. For example, the signal processing section 125 is capable of executing processing the same as processing of the signal processing section 118 of the image pickup apparatus 110 on an image obtained by the image pickup section 112 when photographing parameters during photographing of the image pickup apparatus 110 are changed. Consequently, the signal processing section 125 can obtain a check image for checking an image obtained by the photographing. That is, the signal processing section 125 can obtain a check image (hereinafter referred to as simulation image) the same as an image obtained by appropriately setting photographing parameters and image processing parameters with the image pickup apparatus 110.

Note that the image to be checked includes a plurality of still images. Therefore, since the plurality of still images are continuously reproduced, the image may be considered a moving image. The same applies to other embodiments.

The control section 121 uses an image acquired by the image pickup apparatus 110 as an image serving as a base of the simulation image (hereinafter referred to as base image). The control section 121 receives, via the communication sections 116 and 122, a picked-up image outputted from the signal processing section 118 of the image pickup apparatus 110 and gives the picked-up image to the signal processing section 125 as the base image. The signal processing section 125 generates the simulation image through image processing performed on the base image using various parameters. The control section 121 may use a through-image obtained by the image pickup apparatus 110 as the base image or may use an image recorded in the recording section 114 or the provisional recording section 115.

The control section 121 can control the display control section 126 and give an image after the signal processing of the signal processing section 125 to the display section 127. The display section 127 includes a display screen such as an LCD and displays the image given from the display control section 126. The display control section 126 can display various menu indications and the like on the display screen.

A touch panel functioning as the operation section 123 may be provided on the display screen of the display section 127. The touch panel can generate an operation signal corresponding to a position on the display screen pointed by the user with a finger. The operation signal is supplied to the control section 121. Consequently, the control section 121 can detect a position on the display screen touched by the user and slide operation in which the user slides the finger on the display screen. The control section 121 can execute processing corresponding to user operation.

For example, the control section 121 can control the display control section 126 to display a simulation image on the display screen of the display section 127. In order to change the simulation image to a desired image, the control section 121 can control the display control section 126 to display adjustment indication for adjusting various parameters used for photographing and image processing of the image pickup apparatus 110.

The control section 121 sets, in the signal processing section 125, setting values of parameters by user operation on the adjustment indication. The signal processing section 125 generates the simulation image using the parameters based on the user operation. Consequently, the user can change the simulation image to an image desired by the user while viewing the simulation image. That is, the user can visually match the simulation image with preference of the user.

The control section 121 can transmit necessary various parameters for obtaining the simulation image desired by the user to the image pickup apparatus 110 via the communication section 122. When photographing parameters and signal processing parameters are given via the communication section 116, the control section 111 of the image pickup apparatus 110 records the parameters in the recording section 114 and causes the image pickup apparatus 110 to carry out the photographing and the signal processing conforming to the parameters.

For example, during the time-lapse photographing, the control section 111 thereafter performs photographing with the photographing parameters designated from the information terminal apparatus 120 and sets the designated parameters in the signal processing section 118. Further, the control section 111 applies the parameters from a photographing start time in the past. That is, when the parameters are designated from the information terminal apparatus 120, the control section 111 reads out a picked-up image recorded in the provisional recording section 115 after a time-lapse photographing start and performs image processing using the designated signal processing parameters. For example, concerning HDR image processing, the control section 111 performs, from a start time of photographing in the past, according to designated parameters, selection of an image to be composed and generates an image after the composition (hereinafter referred to as HDR image).

The control section 111 records a generated series of HDR images in the provisional recording section 115 as well. The control section 111 receives a change of parameters from the information terminal apparatus 120 until the time-lapse photographing ends. At a stage when the time-lapse photographing ends, the control section 111 gives the series of HDR images recorded in the provisional recording section 115 to the recording section 114 and records the HDR images in the recording section 114.

Figure 11:
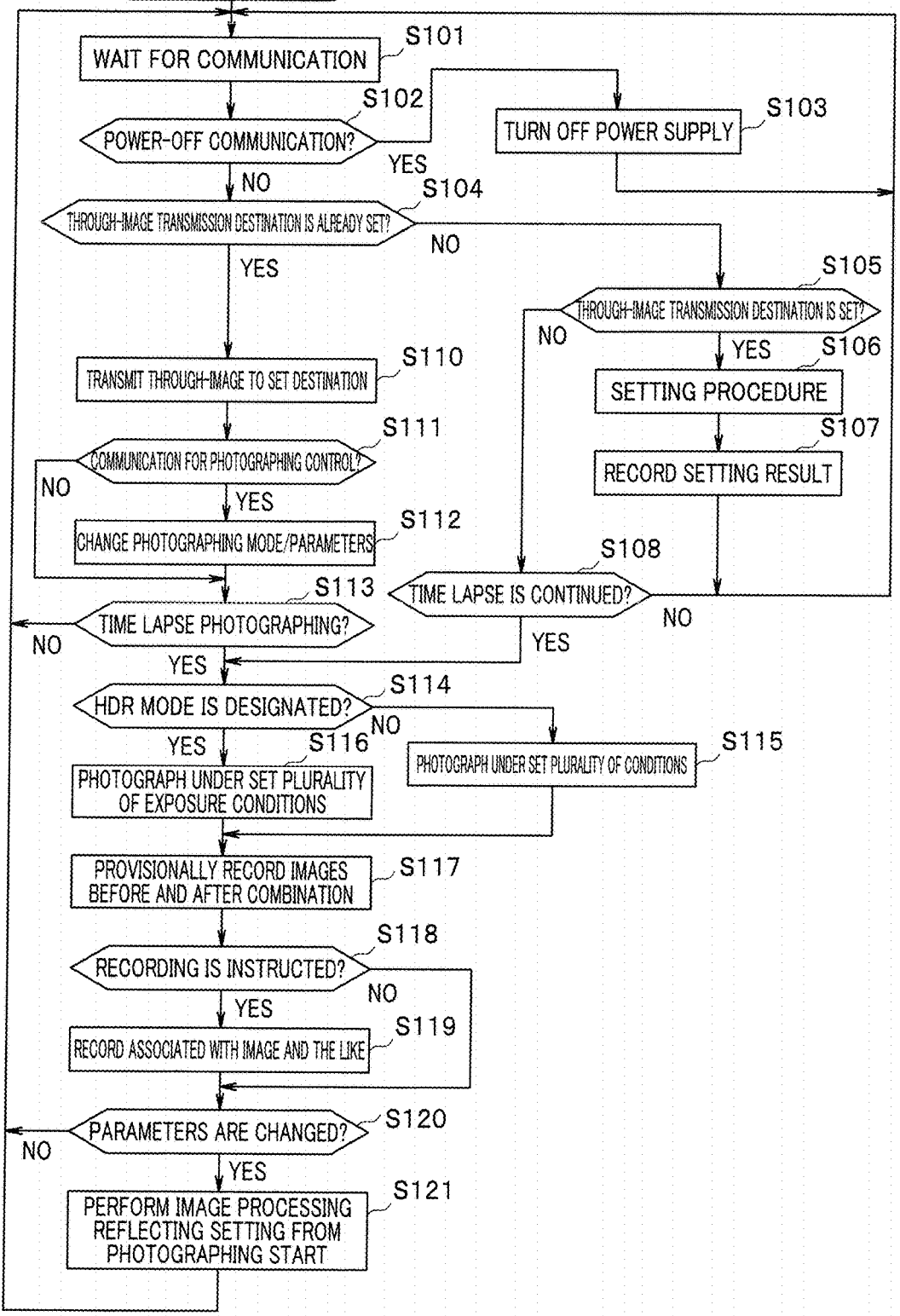
FIG. 11 is a flowchart for explaining operation of the image pickup apparatus.
Figure 12:
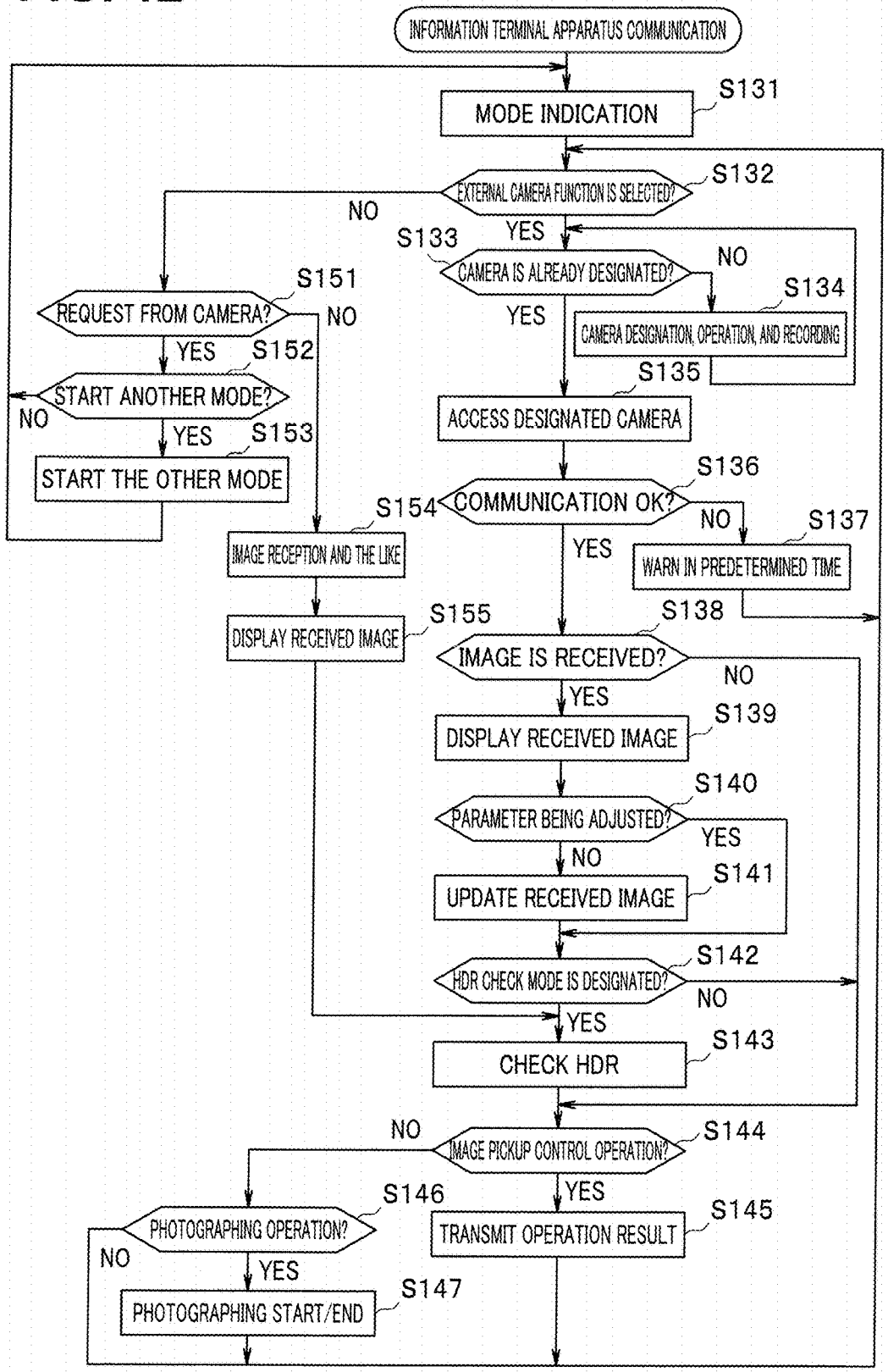
FIG. 12 is a flowchart for explaining operation of the information terminal apparatus.
Figure 13A:
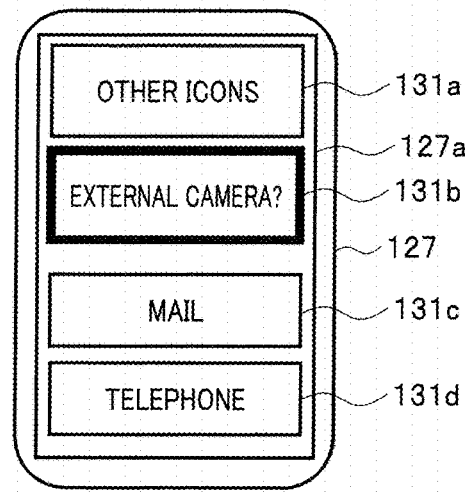
FIG. 13A is an explanatory diagram showing an example of an image displayed on a display screen of the information terminal apparatus.
Figure 13B:
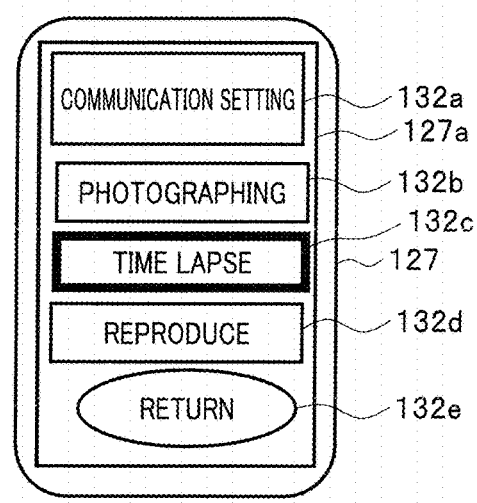
FIG. 13B is an explanatory diagram showing an example of an image displayed on the display screen of the information terminal apparatus.

Operations of the image pickup apparatus 110 and the information terminal apparatus 120 according to the embodiment configured as explained above are explained with reference to FIGS. 11 to 16. FIGS. 11 and 12 are respectively flowcharts for explaining the operations of the image pickup apparatus 110 and the information terminal apparatus 120. FIGS. 13A to 13E are explanatory diagrams showing examples of images displayed on the display screen of the information terminal apparatus 120. FIG. 14 is a flowchart for explaining operation of the HDR processing. FIGS. 15A to 15E are explanatory diagrams for explaining HDR images obtained by the HDR processing. FIG. 16 is an explanatory diagram for explaining timing of processing in the present embodiment.

In step S131 in FIG. 12, the control section 121 of the information terminal apparatus 120 controls the display control section 126 to display function selection indication. FIG. 13A shows an example of the function selection indication displayed on a display screen 127a of the display section 127. In the example shown in FIG. 13A, a selection button 131a for selecting other functions, a selection button 131b for selecting an external camera function, a selection button 131c for selecting a mail function, and a selection button 131d for selecting a telephone function are displayed on the display screen 127a.

It is assumed that the user touches the selection button 131b and selects the external camera function. The control section 121 determines in the next step S132 whether the external camera function is selected. When the external camera function is not selected, in step S151, the control section 121 determines presence or absence of a request from an external camera and, when a request occurs, determines whether the request is a request for starting another mode (step S152). When the request is the request for starting another mode, the control section 121 starts the other mode in step S153 and returns the processing to step S131. When no request for starting another mode occurs, the control section 121 returns the processing from step S152 to step S131. When no request from the external camera occurs, the control section 121 receives an image from the external camera in step S154, displays the received image (step S155), and proceeds to step S143.

When the external camera function is selected, the control section 121 shifts the processing from step S132 to step S133 and determines whether the external camera is already designated. When the external camera is not designated, in step S134, the control section 121 receives camera designation operation for setting of wireless connection, setting of an ID and a password, and the like, records designated information in the recording section 124, and thereafter returns the processing to step S133.

When determining in step S133 that the external camera is already designated, in step S135, the control section 121 causes the communication section 122 to establish communication with the communication section 116 of the image pickup apparatus 110, accesses the image pickup apparatus 110, which is the external camera, and advances the processing to step S136.

On the other hand, the control section 111 of the image pickup apparatus 110 is in a communication standby state in step S101. In the next step S102, the control section 111 determines whether power-off communication has occurred. When the power-off communication has occurred, the control section 111 turns off a power supply in step S103 and returns the processing to step S101.

When determining in step S102 that the power-off communication has not occurred, the control section 111 shifts to step S104 and determines whether a destination of through-image transmission is already set. When the destination of the through-image transmission is already set, the control section 111 transmits a through-image to the destination of the communication (step S110) and proceeds to step S111. That is, the control section 111 gives a picked-up image acquired by the image pickup section 112 to the signal processing section 118 and transmits the picked-up image after the signal processing from the communication section 116 to the information terminal apparatus 120 as the through-image. When determining in step S136 that the communication is established, in step S138, the control section 121 of the information terminal apparatus 120 receives the through-image with the communication section 122. The control section 121 shifts from step S138 to step S139, gives the through-image received via the communication section 122 to the display control section 126, and thereafter proceeds to step S140. In this way, the through-image acquired by the image pickup apparatus 110 is displayed on the display screen 127a of the display section 127. Note that, when not receiving an image in step S138, the control section 121 shifts the processing to step S144. When determining in step S136 that the communication is not established, the control section 121 performs a warning such as warning indication after elapse of a predetermined time (step S137) and thereafter returns the processing to step S132.

Note that the control section 121 may give the through-image to the signal processing section 125 as a base image for simulation image generation. However, when generation processing for a simulation image is already performed, it is desirable not to update the base image. Therefore, the control section 121 determines in step S140 whether parameter adjustment for the simulation image generation is being performed. When the parameter adjustment is not being performed, the control section 121 updates the base image with the received image (step S141) and proceeds to step S142. When the parameter adjustment is being performed, the control section 121 shifts the processing to step S142 without updating the base image.

In the image pickup apparatus 110, when the destination of the through-image transmission is not set, in step S105, the control section 111 determines whether setting operation for the destination of the through-image transmission is performed. When the setting operation for the through-image transmission destination is performed, after performing a setting procedure in step S106, the control section 111 records setting information in the recording section 114 (step S107) and returns the processing to step S101.

Note that, in the image pickup apparatus 110, when the time-lapse photographing is already performed, the control section 111 shifts the processing from step S105 to step S114 through step S108 and continues the time-lapse photographing. Note that, when determining in step S108 that the time-lapse photographing is not continued, the control section 111 returns the processing to step S101.

In step S111, the control section 111 of the image pickup apparatus 110 determines whether communication for photographing control is performed. When photographing parameters, parameters of image processing, and the like from the information terminal apparatus 120 are received, the control section 111 shifts from step S111 to step S112, performs a change of a photographing mode and a change of the parameters, and proceeds to step S113. When determining in step S111 that the communication for photographing control is not performed, the control section 111 shifts the processing to step S113.

It is assumed that the user performs photographing operation for the time-lapse photographing. The photographing operation can be performed not only by the operation section 119 of the image pickup apparatus 110 but also by the operation section 123 of the information terminal apparatus 120. For example, the control section 121 of the information terminal apparatus 120 can control the display control section 126 to display a mode selection screen shown in FIG. 13B. In an example shown in FIG. 13B, a selection button 132a for selecting a communication setting mode, a selection button 132b for selecting a normal photographing mode, a selection button 132c for selecting a time-lapse photographing mode, a selection button 132d for selecting a reproduction mode, and a return button 132e for returning to a function selection screen are displayed on the display screen 127a.

It is assumed that the user touches the selection button 132c and selects the time-lapse photographing mode. Then, the control section 121 transmits a photographing instruction for the time-lapse photographing to the control section 111 of the image pickup apparatus 110 via the communication sections 122 and 116.

The control section 111 determines in step S113 whether the photographing instruction for the time-lapse photographing is received. The control section 111 shifts the processing to step S114 according to the photographing instruction for the time-lapse photographing from the information terminal apparatus 120. If the instruction is not received, the control section 111 returns the processing to step S101. Note that, when an instruction for normal photographing is received rather than the time-lapse photographing, normal photographing is performed (not shown in the figure). The control section 111 determines whether an HDR mode is designated in step S114.

The HDR mode is explained as image processing that is easy to explain and is popular. However, the present embodiments may be applied to any composition mode or any image processing mode. A preference mode in which a visual check is important and the user desires to perform manual operation is effective.

When the HDR mode or the like is not designated, the control section 111 performs photographing under conditions set in step S115 and proceeds to step S117. When the HDR mode is designated, the control section 111 performs photographing under a plurality of conditions set in step S116 and proceeds to step S117. That is, in step S116, photographing under a set plurality of exposure conditions is performed.

In the present embodiment, during the time-lapse photographing, the control section 111 gives a picked-up image acquired by the image pickup section 112 and subjected to the signal processing by the signal processing section 118 to the provisional recording section 115 and provisionally recorded in the provisional recording section 115 until a photographing end time of the time-lapse photographing. Note that, during the HDR mode, the control section 111 records both of an image before HDR imaging and an image after the HDR imaging in the provisional recording section 115 until a photographing end of the time-lapse photographing (step S117) and proceeds to step S118.

Note that, in the present embodiment, as explained above, when new parameters are designated from the information terminal apparatus 120 halfway in the time-lapse photographing, HDR imaging processing is performed using the new parameters. It is necessary to provisionally record the image before the HDR imaging until the photographing end time of the time-lapse photographing. However, depending on a processing time or the like required for the HDR imaging processing, the image after the HDR imaging does not always have to be provisionally recorded.

It is assumed that the user checks quality of an HDR image obtained by the time-lapse photographing. Depending on the quality, the user changes setting of the HDR imaging processing. In the present embodiment, it is possible to perform, in the information terminal apparatus 120, a check and a setting change of an image halfway in photographing of the time-lapse photographing. The control section 121 of the information terminal apparatus 120 can display, on the basis of user operation, on the display screen 127a of the display section 127, a setting menu screen for a check and a setting change of an image obtained by the image pickup apparatus 110.

Figure 13C:
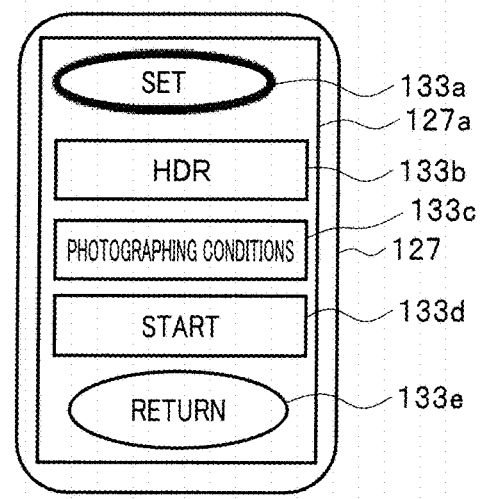
FIG. 13C is an explanatory diagram showing an example of an image displayed on the display screen of the information terminal apparatus.
Figure 14:
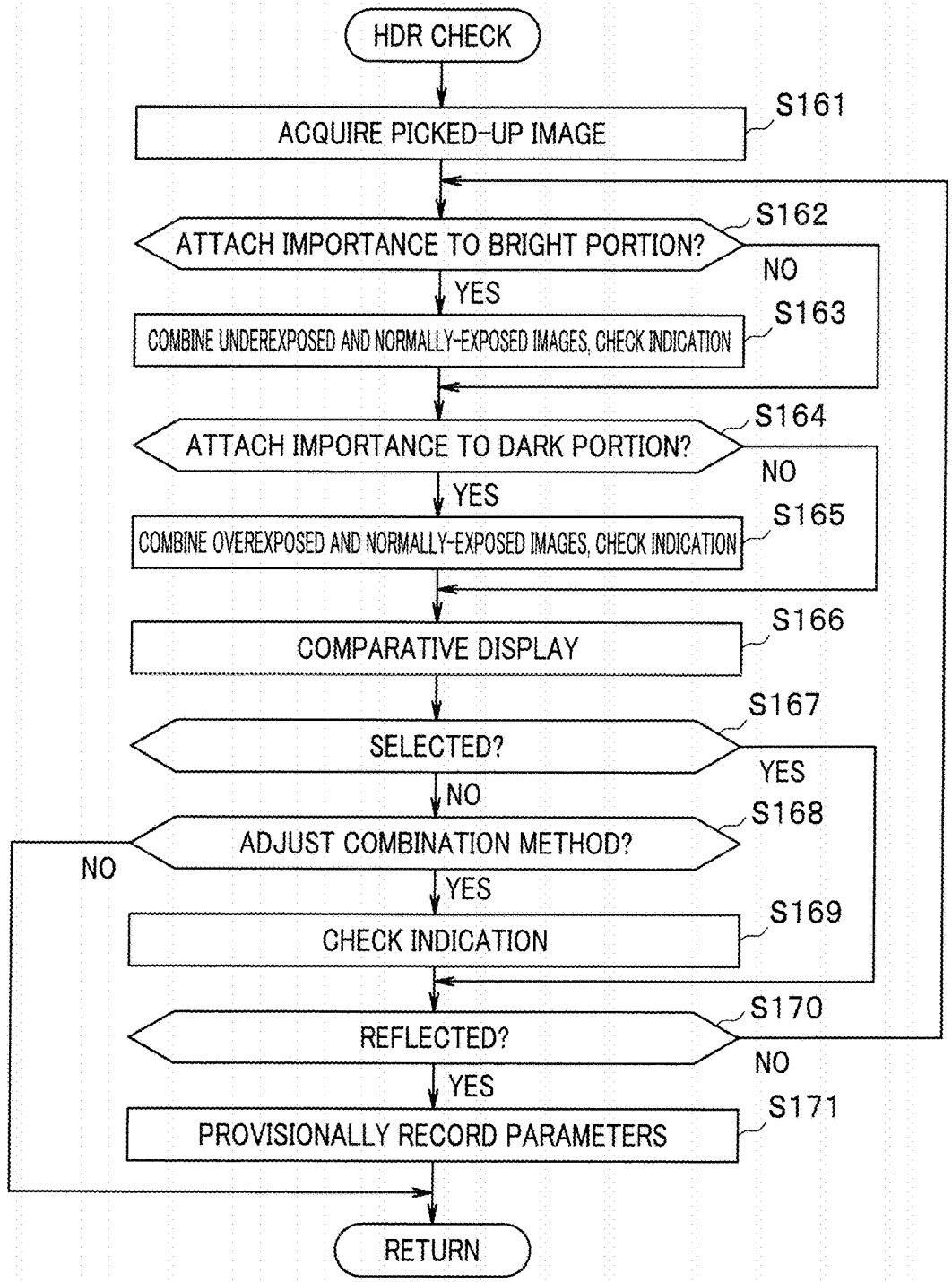
FIG. 14 is a flowchart for explaining operation of HDR processing.

FIG. 13C shows the setting menu screen displayed on the display screen 127a of the information terminal apparatus 120. In an example shown in FIG. 13C, indication 133a indicating the setting menu screen, a selection button 133b for designating an HDR check mode for performing a check and a setting change of an HDR composed image, a selection button 133c for designating a setting change of photographing conditions, and a selection button 133d for designating a start of a photographing setting change are displayed on the display screen 127a. The user performs operation on the selection button 133b, whereby a check and setting change mode for an image of the HDR imaging is designated.

In step S142, the control section 121 of the information terminal apparatus 120 determines whether the HDR check mode is designated. When the user designates the HDR check mode, the control section 121 shifts the processing to step S143, executes the HDR check mode, and proceeds to step S144. When the HDR check mode is not designated, the control section 121 shifts the processing from step S142 to step S144. The "HDR" is explained as an example because the "HDR" is a mode that is easy to understand and easy to explain and is popular and is image processing on which the user desires to reflect preference of the user. However, any image processing in which visual recognition is important and the user desires to perform manual operation is acceptable.

FIG. 14 shows an example of specific processing of the HDR check mode in FIG. 12. In the HDR check mode, the control section 121 acquires a picked-up image as a base image in step S161 and proceeds to the next step S162. During the HDR photographing, the control section 111 of the image pickup apparatus 110 obtains a plurality of picked-up images with different exposures. The control section 121 of the information terminal apparatus 120 acquires the plurality of picked-up images with different exposures picked up by the image pickup apparatus 110. Note that, as the base image, a through-image may be used or the picked-up image recorded in the recording section 114 or the provisional recording section 115 may be used.

The control section 121 causes the display section 127 to display the plurality of picked-up images with different exposures on the display screen 127a of the display section 127. The control section 121 causes the display section 127 to display an HDR effect check button in order to check an HDR image.

Figure 13D:
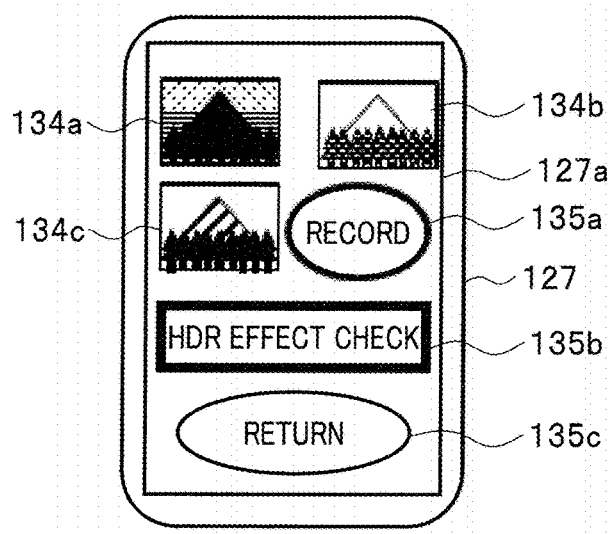
FIG. 13D is an explanatory diagram showing an example of an image displayed on the display screen of the information terminal apparatus.

FIG. 13D shows an example of screen display in this case. In FIG. 13D, three picked-up images 134a to 134c with different exposures are displayed on the display screen 127a. In FIG. 13D, an example is shown in which an HDR effect check button 135b for checking an HDR effect, a return button 135c for returning to the display shown in FIG. 13C, and a recording button 135a for performing recording by the sound collecting section 113 are displayed.

It is assumed that the user performs operation of the HDR effect check button 135b. Then, the control section 121 controls the display control section 126 to display an HDR effect check screen on which the HDR image is displayed.

Figure 13E:
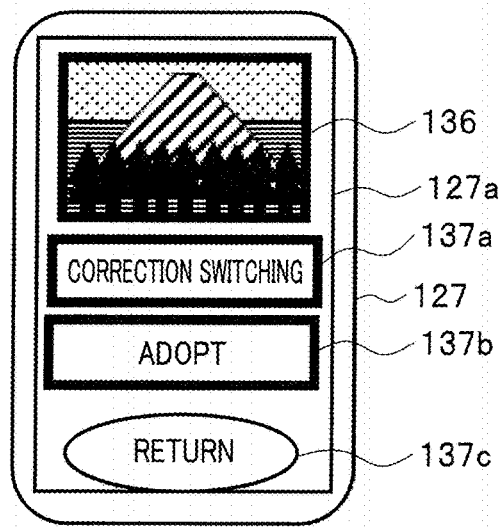
FIG. 13E is an explanatory diagram showing an example of an image displayed on the display screen of the information terminal apparatus.

FIG. 13E shows the HDR effect check screen. HDR effect check indication 136, a correction switching button 137a, and an adopt button 137b are displayed on the display screen 127a. The user refers to the HDR effect check indication 136. When the user is dissatisfied with the HDR image, the user operates the correction switching button 137a in order to change a composing method for the HDR image.

When detecting the operation of the correction switching button 137a by the user, the control section 121 receives a setting change of parameters. For example, the control section 121 causes the display section 127 to display, on the display screen 127a, a selection button for selecting whether importance is attached to a brighter portion or importance is attached to a darker portion in HDR imaging (not shown in the figure).

Figure 15A:
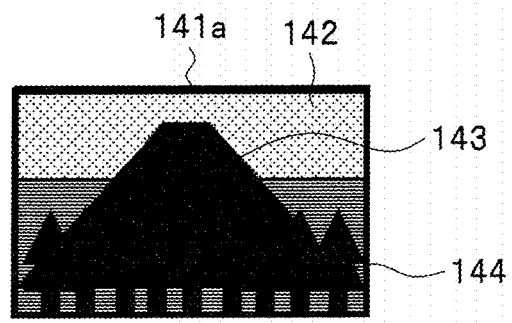
FIG. 15A is an explanatory diagram for explaining an HDR image obtained by the HDR processing.
Figure 15B:
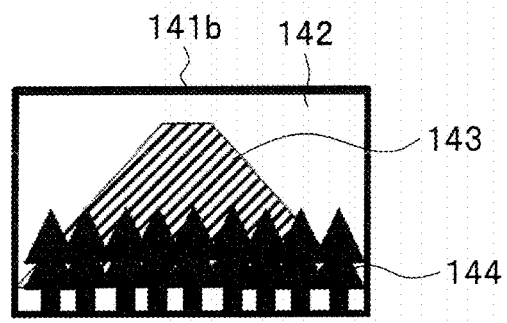
FIG. 15B is an explanatory diagram for explaining an HDR image obtained by the HDR processing.
Figure 15C:
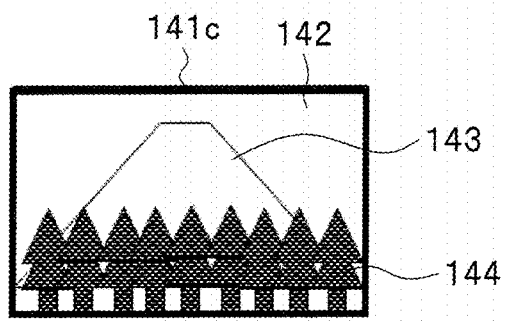
FIG. 15C is an explanatory diagram for explaining an HDR image obtained by the HDR processing.

FIGS. 15A to 15E are diagrams for explaining HDR imaging processing for attaching importance to a bright portion and HDR imaging processing for attaching importance to a dark portion. FIGS. 15A to 15C show three picked-up images 141a to 141c with different exposure values concerning the same object having the same angle of view. An image 141a in FIG. 15A shows an example of underexposure. An image 141b in FIG. 15B shows an example of normal exposure. An image 141c in FIG. 15C shows an example of overexposure.

The picked-up images 141a to 141c in FIGS. 15A to 15C include an image 143 of a mountain in the center, an image 144 of a relatively dark wood in the front of the mountain, and an image 142 of a relatively bright sky behind the mountain. The image 141a in FIG. 15A indicates underexposure. An image 144 of a dark wood in the image 141a indicates black solid. Conversely, the image 141c in FIG. 15C indicates overexposure. An image 143 portion of the sky in the image 141c indicates white void.

Figure 15D:
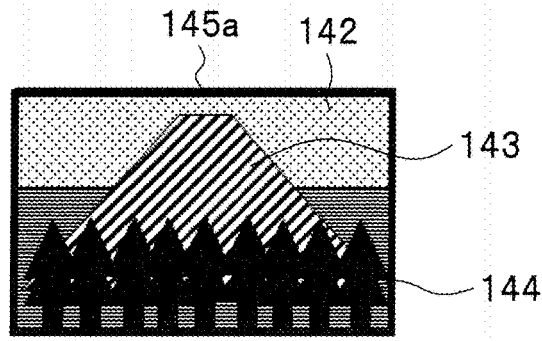
FIG. 15D is an explanatory diagram for explaining an HDR image obtained by the HDR processing.
Figure 16:
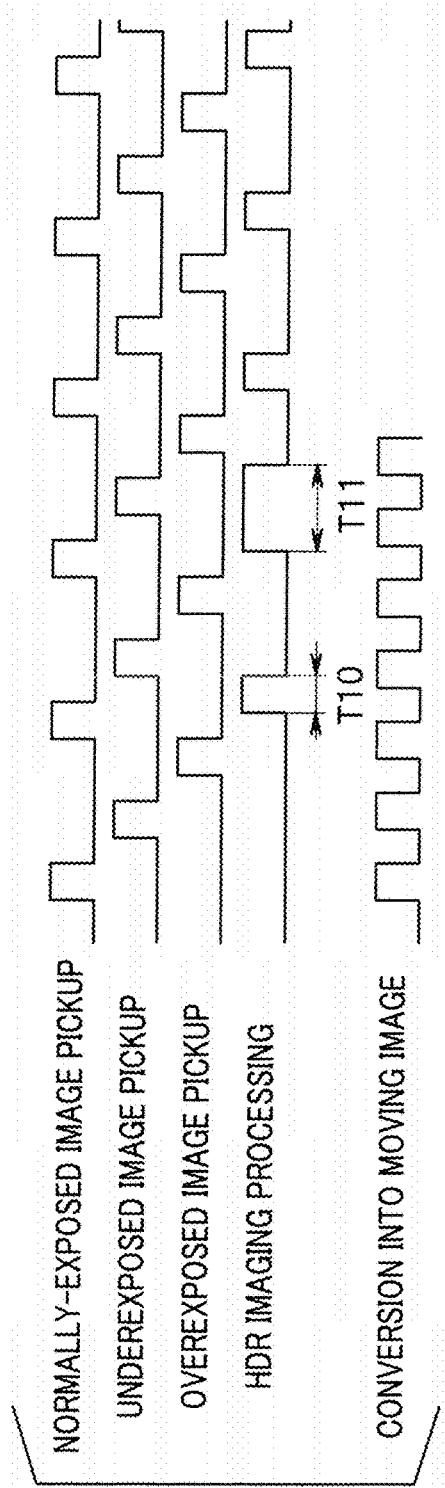
FIG. 16 is an explanatory diagram for explaining timing of processing in the embodiment.

In the HDR photographing mode, a plurality of picked-up images with different exposure values are combined. FIG. 15D shows an HDR image 145a obtained by combining the picked-up image 141a shown in FIG. 15A picked up at an exposure lower than a proper exposure (underexposure) and the picked-up image 141b shown in FIG. 15B picked up at the proper exposure (normal exposure). That is, the HDR image 145a is capable of representing a color of the image 142 of the sky in the bright portion and is an image that attaches importance to the bright portion.

Figure 15E:
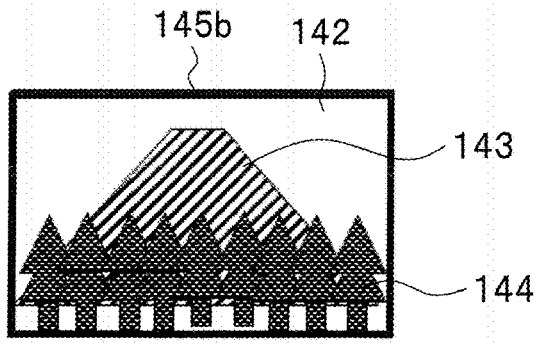
FIG. 15E is an explanatory diagram for explaining an HDR image obtained by the HDR processing.

On the other hand, FIG. 15E shows an HDR image 145b obtained by combining the picked-up image 141c shown in FIG. 15C picked up at an exposure higher than the proper exposure (overexposure) and the picked-up image 141b shown in FIG. 15B picked up at the proper exposure (normal exposure). That is, the HDR image 145b is capable of representing a color of an image 144 of the wood in the dark portion and is an image that attaches importance to the dark portion.

In step S162, the control section 121 of the information terminal apparatus 120 determines whether the user has performed setting operation for attaching importance to a bright portion. When the user has performed the setting operation for attaching importance to a bright portion, the control section 121 controls the signal processing section 125 to perform HDR imaging processing for attaching importance to a bright portion and obtains a simulation image in step S163 and thereafter proceeds to step S164. For example, when images shown in FIGS. 15A to 15C are transferred from the image pickup apparatus 110, the signal processing section 125 subjects the picked-up image 141a shown in FIG. 15A and the picked-up image 141b shown in FIG. 15B to the HDR imaging processing to obtain the simulation image. The control section 121 causes the display section 127 to display the simulation image on the display screen 127a. Note that the simulation image is displayed on the display screen 127a as the HDR effect check indication 136 shown in FIG. 13E. When determining in step S162 that the user has not performed the setting operation for attaching importance to the bright portion, the control section 121 shifts the processing to step S164.

In step S164, the control section 121 determines whether the user has performed setting operation for attaching importance to a dark portion. When determining that the user has performed the setting operation for attaching importance to the dark portion, the control section 121 proceeds to step S164. When determining that the user has not performed the setting operation for attaching importance to the dark portion, the control section proceeds to step S166. When the user has performed the setting operation for attaching importance to the dark portion, the control section 121 controls the signal processing section 125 to perform HDR imaging processing for attaching importance to the dark portion and obtains a simulation image in step S165 and thereafter proceeds to step S166. For example, when the images shown in FIGS. 15A to 15C are transferred from the image pickup apparatus 110, the signal processing section 125 subjects the picked-up image 141c shown in FIG. 15C and the picked-up image 141b shown in FIG. 15B to the HDR imaging processing to obtain the simulation image. The control section 121 causes the display section 127 to display the simulation image on the display screen 127a. Note that the simulation image is displayed on the display screen 127a as the HDR effect check indication 136 shown in FIG. 13E.

The control section 121 may cause the display section 127 to display, on the display screen 127a for comparison, the simulation image that attaches importance to the bright portion and the simulation image that attaches importance to the dark portion (step S166). The user can select a desired simulation image referring to the comparative display on the display screen 127a. Further, when the user is dissatisfied with both of the simulation images displayed for comparison, the user is capable of further performing adjustment.

Subsequently, the control section 121 receives selection operation for the simulation image by the user (step S167). When the user does not desire the selection, the control section 121 determines whether further adjustment work of a composing method is present (step S168). When the further adjustment work is absent, the control section 121 returns from the flow of FIG. 14 to the flow of FIG. 12. FIGS. 15A to 15E show the examples in which the HDR composed image is generated from the three picked-up images with different exposures. When a large number of picked-up images are used for the HDR imaging, picked-up images selectable for the HDR imaging increase. It is possible to perform fine adjustment.

When the user has performed operation for desiring composition processing for attaching importance to a brighter portion, the control section 121 shifts the processing from step S168 to step S169 and controls the signal processing section 125 to use, for the HDR imaging, a picked-up image picked up at a lower exposure. Subsequently, the control section 121 displays a simulation image by the control on the display screen 127a as the HDR effect check indication 136 (step S169). Conversely, when the user has performed operation for desiring composition processing for attaching importance to a darker portion, the control section 121 controls the signal processing section 125 to use, for the HDR imaging, a picked-up image picked up at a higher exposure. The control section 121 displays a simulation image by the control on the display screen 127a as the HDR effect check indication 136 (step S169).

Note that, in the example shown in FIG. 14, the adjusting method of one of the adjustment for attaching importance to the bright portion and the adjustment for attaching importance to the dark portion is selected. However, the user may directly designate which image is used for the HDR imaging processing.

When the user satisfies with the simulation image, the user operates the adopt button in order to adopt parameters set by the user. In the next step S170, the control section 121 detects the operation of the adopt button by the user as reflecting operation of the parameters. The control section 121 shifts the processing to step S171 and records the parameters by the user operation, that is, a composing method of the HDR imaging processing in the recording section 124.

Note that, when the user desires the selection in step S167, the control section 121 shifts the processing to step S170 and determines whether the reflecting operation of the parameters by the user is performed. When determining in step S170 that the reflecting operation of the parameters by the user is not performed, the control section 121 returns the processing to step S162. When provisional recording is performed in step S171, the control section 121 returns the processing in step S144 in FIG. 12.

The control section 121 determines whether operation for setting parameters is performed in the HDR check mode. When the parameter setting by the user is performed, the control section 121 shifts the processing from step S144 to step S145, transmits a setting result of the parameters to the image pickup apparatus 110, and returns the processing to step S132.

Note that, when the parameter operation by the user is not performed, the control section 121 determines presence or absence of photographing operation in step S146. When the photographing operation is performed, the control section 121 generates a command for a start, an end, and the like of photographing according to the photographing operation, transmits the command to the image pickup apparatus 110 (step S147), and returns the processing to step S132. When the photographing operation is not performed, the control section 121 directly returns the processing from step S146 to step S132.

The control section 111 of the image pickup apparatus 110 determines presence or absence of a recording instruction in step S118. When recording is instructed, the control section 111 controls the sound collecting section 113 and the provisional recording section 115 to perform recording associated with an image in step S119 and proceeds to step S120. When the recording is not instructed, the control section 111 directly proceeds to step S120.

When parameters are set anew from the information terminal apparatus 120 halfway in the time-lapse photographing in step S120, the control section 111 shifts the processing to step S121, performs image processing reflecting setting from a start time of photographing in the past, and thereafter returns the processing to step S101. That is, the control section 111 controls the signal processing section 118 and performs composition processing of an HDR image according to the parameters designated from the beginning of the time-lapse photographing. Note that, when the parameters are not changed, the control section 111 directly returns the processing from step S120 to step S101.

Naturally, the setting does not have to be reflected from the beginning and may be reflected from any position. Therefore, according to the present invention, it is possible to provide an information terminal apparatus including a communication section configured to perform communication with an image pickup apparatus that obtains a picked-up image obtained by picking up an image of an object at a predetermined time interval and a signal processing section configured to generate a simulation image through image processing on the picked-up image transmitted from the image pickup apparatus via the communication section, the information terminal apparatus transmitting parameters for image processing, on which the signal processing section reflects a generation result of the simulation image, to the image pickup apparatus via the communication section, or a control method for the information terminal apparatus. It is possible to simplify time-lapse photographing by picture formation on which preference of the user is reflected. This is considered to be an image pickup apparatus including an image pickup section capable of performing time-lapse photographing for picking up an image of an object at a predetermined time interval, a signal processing section configured to obtain a picked-up image through image processing on the image obtained by the image pickup section, a communication section configured to transmit the picked-up image to an information terminal apparatus, and a control section configured to apply, when parameters used for the image processing on the picked-up image of the signal processing section are received by the communication section from the information terminal apparatus, the received parameters to the time-lapse photographing and cause the signal processing section to execute the image processing.

In terms of the HDR, the parameters for image processing only have to be data converted into numerical values such as the number and an exposure difference of composed images, an exposure amount for selection of an image portion and a threshold of image data during composition, and a ratio of blending of the image data during the composition. The information terminal and the image pickup apparatus only have to determine in which calculation or program the respective numerical values are used. Not only the numerical values but also types, modes, and the like of processing may be converted into numerical values and determined. The numerical values may be called parameters. When composition processing to be applied is depth composition, the parameters may be a position and a position difference of a focus, and, in the case of super resolution, the number of images to be combined, and an amount of adjustment of pixel shift adjustment. Except combination of a plurality of images, an exposure amount, a color adjustment amount, a contrast adjustment amount, and the like are simply correspond to the parameters.

Note that, in the above explanation, when a change of the parameters occurs halfway in the time-lapse photographing, the control section 111 is explained as changing, at a point in time when the change occurs, the composing method of the HDR imaging from the beginning of the time-lapse photographing according to the parameters. However, after the end of the time-lapse photographing, the composing method of the HDR imaging may be changed according to the changed parameters. The generation processing for an HDR image may be performed from the beginning of the time-lapse photographing.

A sudden change of the parameters is unnatural, it is also possible to smoothly change the parameters. That is, the smooth change of the parameters can be realized if the set parameters change little by little from initial values to set values. To realize the smooth change of the parameters, the image pickup apparatus may switch the parameters, for example, by a predetermined number of frames. The information terminal may be able to instruct which frame changes and how the frame changes. That is, the apparatus and the method in the present embodiment can also be grasped as an information terminal apparatus including a control section configured to apply the parameter change stepwise halfway in the time-lapse photographing and a method for the information terminal apparatus or an image pickup apparatus including the control section and a method for the image pickup apparatus. As one characteristic of the image pickup apparatus and the control method for the image pickup apparatus, the parameters can be applied to a photographing result before a reception point in time or the parameters are sequentially changed as time elapses.

FIG. 16 shows timing of the time-lapse photographing by the HDR imaging in the present embodiment. In the HDR photographing, a plurality of times of photographing with different exposures are performed. FIG. 16 shows an example in which image pickup is performed in a time-division manner with three exposures: normal exposure, underexposure, and overexposure. When the three times of photographing is performed, the control section 111 obtains an HDR image through HDR processing in which picked-up images with the three exposures are used. When the images obtained by the time-lapse photographing are converted into a moving image, as shown in FIG. 16, it is possible to reproduce the moving image in a time period shorter than a time period required for the time-lapse photographing.

It is assumed that the user performs a check of the HDR image in the time-lapse photographing. After performing the check of the HDR image, the user performs setting operation for parameters. The new parameters are given to the control section 111 of the image pickup apparatus 110. The control section 111 instructs the signal processing section 118 to perform HDR imaging processing in which the new parameters are used. The signal processing section 118 performs HDR re-imaging processing from a start time of the time-lapse photographing in the past. A period T11 in FIG. 16 shows a processing period of the HDR re-imaging processing. The period T11 is a period longer than a processing period T10 of normal HDR imaging processing. However, at an end point in time of the time-lapse photographing, HDR imaging based on new parameters already set by the user is performed. Immediately after photographing of the time-lapse photographing, the user can obtain a desired HDR time-lapse photographed image.

In this way, in the present embodiment, halfway in photographing of the time-lapse photographing, change work for parameters is facilitated and the image processing section is caused to execute image processing on which the changed parameters are reflected. Consequently, the user can easily obtain a desired photographed image.

It is possible to check the HDR image, which is a photographing result of the time-lapse photographing, with the information terminal apparatus connected to the image pickup apparatus by radio or the like without changing a photographing state of the image pickup apparatus. It is possible to perform a setting change of the parameters for obtaining a composed image. Consequently, halfway in photographing of the time-lapse photographing, the user can obtain a desired image without affecting the time-lapse photographing. When new parameters are set, the image pickup apparatus obtains a picked-up image, on which the parameters are reflected, from a photographing start time of the time-lapse photographing in the past. Immediately after a photographing end of the time-lapse photographing, the user can obtain a desired image.

Fourth Embodiment

FIG. 17 is an explanatory diagram showing a fourth embodiment of the present invention. A hardware configuration in the present embodiment is the same as the hardware configuration in the third embodiment.

In time-lapse photographing, since a recording time and a reproduction time are different, sound collected during the time-lapse photographing is not reproduced on a real-time basis. Reproduced sound is sometimes reproduced in a shorter time period than actual sound and cannot be heard.

In the present embodiment, the sound collected in the time-lapse photographing is reproduced on a real-time basis.

The control section 111 of the image pickup apparatus 110 records sound of the sound collecting section 113 to be associated with a plurality of picked-up images adjusted to a reproduction time of a time-lapse photographed image. FIG. 17 is a diagram for explaining the recording in this case. FIG. 17 shows an example in which the time-lapse photographing is performed in three kinds of exposures: normal exposure, underexposure, and overexposure. It is assumed that sound collection is performed in a period T12 halfway in the time-lapse photographing.

The control section 111 determines, on the basis of a relation with a reproduction time corresponding to a photographing time of a time-lapse photographed image, the number of picked-up images to which a collected sound signal is allocated. For example, when the reproduction time of the time-lapse photographed image is one tenth of a recording time, the control section 111 allocates collected sound signals to picked-up images picked-up in a period ten times as long as a sound collection time T11. Note that, FIG. 17 shows an example in which a reproduction time of images t1, t2, and the like obtained by performing the time-lapse photographing is approximately two fifth of a recording time.

As indicated by timing of time during reproduction in FIG. 17, during the reproduction, whereas a picked-up image is reproduced in a time period shorter than a recording time, a collected sound is reproduced in an actual time. Note that a time period for collecting sound and a time period for reproducing the sound do not always need to be set the same. If the sound is sufficiently heard during the reproduction, the recording time and the reproduction time may be different.

In this way, in the present embodiment, an effect the same as the effect in the third embodiment can be obtained. In the time-lapse photographing, it is possible to reproduce the collected sound on a real-time basis. It is possible to hear the sound without having an unnatural feeling.

The present invention is not limited to the embodiments per se. In an implementation stage, the constituent elements can be modified and embodied without departing from the spirit of the present invention. Various inventions can be formed by appropriate combinations of a plurality of constituent elements disclosed in the embodiments. For example, several constituent elements among all the constituent elements described in the embodiments may be deleted.

A system for obtaining a favorite image of the user is not limited to an image pickup system for consumer use. It is also possible to apply the present invention to systems for obtaining images for an observation, a diagnosis, and a medical examination by the user. Processing for obtaining a favorite image of the user may be represented as adjustment processing for images for a report and evidence.

For medical purposes, it is possible to apply the present invention to an endoscope and the like as well. It is possible to utilize the present invention when only a process of necessary treatment and only a necessary lesion part are represented as a digest. For scientific purposes, it is possible to utilize the present invention when a moving image in which characteristics of a state of culture of a cell and the like appear most is created. It is possible to control observation and photographing while performing a check of a change in a movie.

Note that, even if the operation flows in the claims, the specification, and the drawings are explained using "first", "next", and the like for convenience, this does not mean that it is essential to implement the operation flows in this order. It goes without saying that portions not affecting the essence of the invention in the respective steps configuring the operation flows can be omitted as appropriate.

Among the techniques explained above, most of the control and the functions mainly explained in the flowcharts often can be set by a computer program. A computer can realize the control and the functions by reading and executing the computer program. The entire or a part of the computer program can be recorded or stored as a computer program product in a portable medium such as a flexible disk, a CD-ROM, or a nonvolatile memory or a storage medium such as a hard disk or a volatile memory. The computer program can be circulated or provided during product shipment or via a portable medium or a communication line. A user can easily realize the information terminal apparatus, the image pickup apparatus, and the image-information processing system by downloading and installing the computer program in a computer via a communication network or installing the computer program in the computer from a recording medium.

What is claimed is:

1. An information terminal apparatus comprising:
a transmitter/receiver configured to perform communication with an external image pickup apparatus capable of performing time-lapse photographing;
a signal processor configured to generate, halfway in a photographing period by the image pickup apparatus, a check image based on a plurality of picked-up images transmitted from the image pickup apparatus and acquired via the transmitter/receiver; and
a display configured to display the check image generated by the signal processor,
wherein the signal processor generates a check moving image based on the plurality of picked-up images transmitted from the image pickup apparatus as the check image and adjusts a frame rate of the check moving image such that display of the check moving image ends within a remaining time until image pickup performed next in the image pickup apparatus.

2. The information terminal apparatus according to claim 1, further comprising a control processor configured to receive operation for changing a setting for repeatedly picking up an image in the image pickup apparatus and instruct the image pickup apparatus to perform the setting based on the operation.

3. The information terminal apparatus according to claim 1, wherein the display displays the remaining time until image pickup performed next in the image pickup apparatus.

4. The information terminal apparatus according to claim 1, wherein the signal processor generates a check moving image, which is the check image, at a frame rate used during moving image generation using repeated image pickup based on a series of picked-up images obtained.

5. The information terminal apparatus according to claim 1, wherein
the signal processor generates a simulation image, which is the check image, with an image processed using image processing parameters with respect to a picked-up image transmitted from the image pickup apparatus via the transmitter/receiver, and
a control processor transmits the image processing parameters used in the simulation image by the signal processor to the image pickup apparatus via the transmitter/receiver.

6. The information terminal apparatus according to claim 5, wherein the control processor controls the image pickup apparatus to retroactively apply the image processing parameters to an image acquired through the time-lapse photographing by the image pickup apparatus before the image pickup apparatus receives the image processing parameters.

7. The information terminal apparatus according to claim 5, the control processor controls the image pickup apparatus to apply, stepwise halfway in the time-lapse photographing by the image pickup apparatus, the image processing parameters.

8. The information terminal apparatus according to claim 5, wherein the display is further configured to display the simulation image, the information terminal apparatus further comprising:
an operation section configured to receive setting operation for the image processing parameters, wherein
the signal processor updates the simulation image on the basis of the setting operation for the image processing parameters.

9. The information terminal apparatus according to claim 5, wherein image processing performed by the image pickup apparatus and image processing performed by the signal processor are at least one of high dynamic range (HDR) imaging processing, depth composition processing, and super-resolution processing.

10. An image pickup apparatus comprising:
an image pickup sensor capable of performing time-lapse photographing;
a signal processor configured to generate, halfway in a photographing period by image pickup of the time-lapse photographing, a check image based on a plurality of picked-up images obtained by the image pickup sensor; and
a display configured to display the check image,
wherein the signal processor generates a check moving image based on the plurality of picked-up images obtained by the image pickup sensor as the check image and adjusts a frame rate of the check moving image such that display of the check moving image ends within a remaining time until image pickup performed next in the image pickup sensor.

11. The image pickup apparatus according to claim 10, further comprising a control processor configured to receive operation for changing a setting for obtaining a picked-up image from the image pickup sensor and instruct the image pickup sensor to perform the setting based on the operation.

12. The image pickup apparatus according to claim 10, wherein the display displays the remaining time until image pickup performed next in the image pickup sensor.

13. The image pickup apparatus according to claim 10, further comprising:
a transmitter/receiver configured to transmit the picked-up images to an external information terminal apparatus; and
a control processor configured to apply, when parameters used for image processing on the picked-up images by the signal processor is received from the information terminal apparatus by the transmitter/receiver, the received parameters to the time-lapse photographing and cause the signal processor to execute image processing.

14. The image pickup apparatus according to claim 13, wherein the control processor performs control for retroactively applying the parameters to an image acquired by photographing of the image pickup sensor before the parameters are received.

15. The image pickup apparatus according to claim 13, wherein the control processor performs control for applying, stepwise, the received parameters to an image acquired by photographing of the image pickup sensor.

16. The image pickup apparatus according to claim 13, wherein image processing performed by the signal processor is at least one of high dynamic range (HDR) imaging processing, depth composition processing, and super-resolution processing.

17. An image-information processing system comprising:
an image pickup apparatus including:
an image pickup sensor capable of performing time-lapse photographing;
a first signal processor configured to generate a moving image formed by a plurality of picked-up images obtained by the image pickup sensor;
a first transmitter/receiver configured to transmit the picked-up images to an information terminal apparatus; and
a first control processor; and
an information terminal apparatus including:
a second transmitter/receiver configured to perform communication with the first transmitter/receiver and receive the picked-up images;
a second signal processor configured to generate, halfway in a photographing period by the image pickup sensor, a check image based on the plurality of picked-up images;
a display configured to display the check image generated by the second signal processor; and
a second control processor configured to receive operation for changing setting for obtaining the plurality of picked-up images in the image pickup sensor, setting information based on the operation being transmitted to the first transmitter/receiver via the second transmitter/receiver,
wherein
the first control processor controls the time-lapse photographing of the image pickup sensor using the setting information received,
the second signal processor generates a simulation image, which is the check image, through image processing on the picked-up images received via the second transmitter/receiver and transmits parameters used for the generation of the simulation image to the first transmitter/receiver as the setting information via the second transmitter/receiver, and
the first control processor applies the parameters transmitted by the second transmitter/receiver and causes the first signal processor to execute image processing.

18. The image-information processing system according to claim 17, wherein image processings in the first and second signal processors are, respectively, at least one of high dynamic range (HDR) imaging processing, depth composition processing, and super-resolution processing.

* * * * *